US012327968B2

(12) United States Patent
Yu et al.

(10) Patent No.: US 12,327,968 B2
(45) Date of Patent: Jun. 10, 2025

(54) ADAPTER HAVING SOCKET BODY

(71) Applicant: GONEO GROUP CO., LTD., Zhejiang (CN)

(72) Inventors: Bin Yu, Zhejiang (CN); Lihe Zheng, Zhejiang (CN); Huijiu Wang, Zhejiang (CN); Han Cheng, Zhejiang (CN); Jingshan Zheng, Zhejiang (CN)

(73) Assignee: GONEO GROUP CO., LTD., Zhejiang (CN)

( * ) Notice: Subject to any disclaimer, the term of this patent is extended or adjusted under 35 U.S.C. 154(b) by 323 days.

(21) Appl. No.: 17/799,858

(22) PCT Filed: Mar. 23, 2021

(86) PCT No.: PCT/CN2021/082480
§ 371 (c)(1),
(2) Date: Aug. 15, 2022

(87) PCT Pub. No.: WO2022/027979
PCT Pub. Date: Feb. 10, 2022

(65) Prior Publication Data
US 2023/0101661 A1 Mar. 30, 2023

(30) Foreign Application Priority Data
Aug. 5, 2020 (CN) ......................... 202010778679.2
Aug. 5, 2020 (CN) ......................... 202010778693.2
(Continued)

(51) Int. Cl.
*H01R 13/627* (2006.01)
*H01R 13/502* (2006.01)
(Continued)

(52) U.S. Cl.
CPC ........... *H01R 31/06* (2013.01); *H01R 13/502* (2013.01); *H01R 13/639* (2013.01); *H01R 13/64* (2013.01)

(58) Field of Classification Search
CPC .... H01R 13/502; H01R 13/639; H01R 13/64; H01R 31/06
(Continued)

(56) References Cited

U.S. PATENT DOCUMENTS 3,960,426 A 6/1976 Heritage
4,626,052 A * 12/1986 Rumble ................. H01R 31/06 439/173
(Continued)

FOREIGN PATENT DOCUMENTS

CN 1736007 A 2/2006
CN 102299454 A 12/2011
(Continued)

OTHER PUBLICATIONS

Notice of Reasons for Refusal in Japanese application No. 2022-537291 issued on Jun. 12, 2023.
(Continued)

*Primary Examiner* — Abdullah A Riyami
*Assistant Examiner* — Vladimir Imas
(74) *Attorney, Agent, or Firm* — Knobbe, Martens, Olson & Bear, LLP

(57) ABSTRACT

An adapter, including a socket body, a guiding body, a movable conducting strip and a control member. The guiding body and the movable conducting strip are both disposed on one side of the socket body facing away from jacks, the control member is connected to the movable conducting strip in a transmission fashion, and is configured to drive the movable conducting strip to rotate relative to the socket body.

17 Claims, 18 Drawing Sheets

(30) Foreign Application Priority Data

| | | | |
|---|---|---|---|
| Aug. 5, 2020 | (CN) | ......................... | 202021610234.5 |
| Aug. 5, 2020 | (CN) | ......................... | 202021610309.X |
| Aug. 19, 2020 | (CN) | ......................... | 202010839080.5 |
| Aug. 19, 2020 | (CN) | ......................... | 202021744535.7 |

(51) Int. Cl.

*H01R 13/639* (2006.01)
*H01R 13/64* (2006.01)
*H01R 31/06* (2006.01)

(58) Field of Classification Search

USPC .......................................................... 439/365
See application file for complete search history.

(56) References Cited

U.S. PATENT DOCUMENTS

| | | | | | |
|---|---|---|---|---|---|
| 5,426,567 | A * | 6/1995 | Opeka | H05K 7/20545 361/740 |
| 5,759,051 | A | 6/1998 | Cancellieri et al. | |
| 5,759,251 | A | 6/1998 | Nakamura et al. | |
| 6,079,992 | A | 6/2000 | Kuchar et al. | |
| 6,328,597 | B1 * | 12/2001 | Epps | H01R 31/06 439/502 |
| 9,837,761 | B1 * | 12/2017 | Hardy | H01R 13/565 |
| 10,194,296 | B2 * | 1/2019 | Tetreault | H04L 12/2838 |
| 11,031,730 | B2 * | 6/2021 | Mitter | H01R 13/08 |
| 11,322,867 | B1 * | 5/2022 | Davidsz | H01R 13/516 |
| 2003/0040228 | A1 * | 2/2003 | Finzer | H01R 13/5829 439/752 |
| 2006/0116011 | A1 | 6/2006 | Sinclair | |
| 2013/0137306 | A1 | 5/2013 | Huang | |
| 2014/0213090 | A1 * | 7/2014 | Todd | G01R 11/04 439/301 |
| 2019/0372285 | A1 * | 12/2019 | Grünberger | H01R 31/065 |
| 2020/0051711 | A1 * | 2/2020 | Ware | H01R 9/03 |
| 2020/0259347 | A1 * | 8/2020 | Pereira | G06F 1/1635 |
| 2022/0396162 | A1 * | 12/2022 | Weyrauch | B60L 53/16 |
| 2023/0101661 | A1 | 3/2023 | Binyu et al. | |
| 2023/0108383 | A1 * | 4/2023 | Zuo | H01R 13/502 439/131 |

FOREIGN PATENT DOCUMENTS

| | | | |
|---|---|---|---|
| CN | 203386996 | U | 1/2014 |
| CN | 104218388 | A | 12/2014 |
| CN | 104993340 | A | 10/2015 |
| CN | 205752702 | U | 11/2016 |
| CN | 205900989 | U | 1/2017 |
| CN | 206022718 | U | 3/2017 |
| CN | 105826774 | B | 6/2017 |
| CN | 208173939 | U | 11/2018 |
| CN | 109004477 | A | 12/2018 |
| CN | 208352662 | U | 1/2019 |
| CN | 109378612 | A | 2/2019 |
| CN | 209184155 | U | 7/2019 |
| CN | 209626475 | U | 11/2019 |
| CN | 209880966 | U | 12/2019 |
| CN | 110676644 | A | 1/2020 |
| CN | 210111668 | U | 2/2020 |
| CN | 210224498 | U | 3/2020 |
| CN | 210326385 | U | 4/2020 |
| CN | 210350315 | U | 4/2020 |
| CN | 210576677 | U | 5/2020 |
| CN | 210576697 | U | 5/2020 |
| CN | 210576894 | U | 5/2020 |
| CN | 210576900 | U | 5/2020 |
| CN | 210779362 | U | 6/2020 |
| CN | 211088687 | U | 7/2020 |
| CN | 111786185 | A | 10/2020 |
| CN | 111786186 | A | 10/2020 |
| CN | 111786213 | A | 10/2020 |
| CN | 111817085 | A | 10/2020 |
| CN | 212462276 | U | 2/2021 |
| CN | 212751294 | U | 3/2021 |
| CN | 113823956 | A | 12/2021 |
| EP | 2282379 | A1 | 2/2011 |
| EP | 3588696 | A1 | 1/2020 |
| JP | S502396 | Y1 | 1/1975 |
| JP | S60170990 | U | 11/1985 |
| JP | S6370685 | U | 5/1988 |
| JP | H01217874 | A | 8/1989 |
| JP | 2002198145 | A | 7/2002 |
| JP | 2006211845 | A | 8/2006 |
| JP | 2008251502 | A | 10/2008 |
| JP | 2024015084 | A | 2/2024 |
| JP | 2024020568 | A | 2/2024 |
| WO | 2017007420 | A1 | 1/2017 |

OTHER PUBLICATIONS

Extended European Search Report in European application No. 21852854.5 issued on Jul. 17, 2023.

International search report of PCT application No. PCT/CN2021/082480 issued on Jun. 28, 2021.

International search report of PCT application No. PCT/CN2021/082467 issued on Jun. 28, 2021.

China National Intellectual Property Administration, First office action of Chinese application No. 202010778679.2 issued on Apr. 7, 2021, which is foreign counterpart application of this US application.

China National Intellectual Property Administration, First office action of Chinese application No. 202010778693.2 issued on May 6, 2021, which is foreign counterpart application of this US application.

China National Intellectual Property Administration, Second office action of Chinese application No. 202010778693.2 issued on Feb. 7, 2022, which is foreign counterpart application of this US application.

China National Intellectual Property Administration, Decision of Rejection of Chinese application No. 202010778693.2 issued on May 26, 2022, which is foreign counterpart application of this US application.

Notice of Reasons for Refusal of Japanese application No. 2023-200956 issued on Sep. 30, 2024.

Notice of Reasons for Refusal of Japanese application No. 2023-200959 issued on Sep. 30, 2024.

Notice of Reasons for Refusal of Japanese application No. 2023-200960 issued on Sep. 30, 2024.

China National Intellectual Property Administration, First office action of Chinese application No. 202010839080.5 issued on Dec. 10, 2024, which is foreign counterpart application of this US application.

China National Intellectual Property Administration, First office action of Chinese application No. 202010712396.8 issued on Dec. 26, 2024, which is foreign counterpart application of this US application.

Decision of Refusal of Japanese application No. 2023-200960 issued on Feb. 25, 2025.

Decision to Grant a Patent of Japanese application No. 2023-200956 issued on Feb. 25, 2025.

* cited by examiner

ADAPTER HAVING SOCKET BODY

CROSS-REFERENCE TO RELATED APPLICATIONS

This application is a US national stage of international application No. PCT/CN2021/082480, filed on Mar. 23, 2021, which claims priority to the Chinese Patent Application No. 202010778679.2, filed on Aug. 5, 2020 and entitled "ADAPTER AND RAIL SOCKET"; the Chinese Patent Application No. 202021610234.5, filed on Aug. 5, 2020 and entitled "ADAPTER AND RAIL SOCKET"; the Chinese Patent Application No. 202010839080.5, filed on Aug. 19, 2020 and entitled "ADAPTER AND RAIL SOCKET"; the Chinese Patent Application No. 202021744535.7, filed on Aug. 19, 2020 and entitled "ADAPTER AND RAIL SOCKET"; the Chinese Patent Application No. 202010778693.2, filed on Aug. 5, 2020 and entitled "ADAPTER AND RAIL SOCKET"; and the Chinese Patent Application No. 202021610309.X, filed on Aug. 5, 2020 and entitled "ADAPTER AND RAIL SOCKET", the disclosures of which are herein incorporated by reference in their entireties.

TECHNICAL FIELD

The present disclosure relates to the field of socket technologies, in particular to an adapter.

BACKGROUND

With the improvement of the quality of life, people need to use more and more electrical appliances, so there are more and more requirements for the number of wall sockets. The number of ordinary wall sockets is often not enough, but a bad appearance will be caused if too many wall sockets are installed. Therefore, a rail socket came into being.

The rail socket includes an adapter and an elongated rail. The rail is installed on a wall, and a rail plug bush in the rail is electrically connected to a wall-mounted power supply line. The adapter has a conducting strip and jacks. When the rail socket is used, the conducting strip of the adapter is plugged into a rail slot of the rail and contacts the rail plug bush in the rail slot. Then, a plug of an electrical appliance is plugged into the jacks of the adapter, and the electrical appliance can take power from the adapter. The rail socket has the advantage that the adapter can be moved arbitrarily within a range by sliding the adapter in the rail, so that the adapter can supply power to electrical appliances in a plurality of positions.

For the rail socket, how to realize the uncharged sliding of the adapter in the rail is a problem worthy of study.

SUMMARY

An adapter is provided. The adapter includes a socket body, a guiding body, a movable conducting strip and a control member; wherein

- the guiding body and the movable conducting strip are both disposed on one side of the socket body facing away from jacks; and
- the control member is connected to the movable conducting strip in a transmission fashion, and configured to drive the movable conducting strip to rotate relative to the socket body.

BRIEF DESCRIPTION OF THE DRAWINGS

The accompanying drawings herein are incorporated into the description and constitute a part of the description, show embodiments that are consistent with the present disclosure, and are used together with the description to explain the principles of the present disclosure. In drawings.

Reference symbols represent the following components:

- 01—rail, 011—opening, 012—accommodating cavity, 013—soft protective strip, 014—rail conducting plug bush, 015—E-pole rail conducting strip;
- 02—adapter;
- 1—socket body, 11*a*—first plug bush, 11*a*—first N-pole plug bush, 112*a*—first L-pole plug bush, 113*a*—first E-pole plug bush, 11*b*—second plug bush, 111*b*—internal plug bush, 12*a*—first limiting groove, 12*b*—second limiting groove;
- 2—guiding body, 21—accommodating groove;
- 3—movable conducting strip
- 4—control member;
- 41*a*—first rotating ring, 411*a*—protrusion, 42*a*—first transmission assembly, 421*a*—toggle rod, 420—mounting portion, 422*a*—transmission rod, 423*a*—first driving rod, 424*a*—first swing spring;
- 41*b*—second rotating ring, 42*b*—second transmission assembly, 421*b*—transmission shaft, 422*b*—driving gear, 423*b*—driven gear, 426*b*—sun gear, 425*b*—second swing spring;
- 5—E-pole conducting member;
- 6—locking member, 61—rotating portion, 62—connecting portion, 63—locking portion, 631—locking portion body, 632—locking block, 6231—guiding surface, 641—deforming portion, 641—top plate, 642—first side plate, 643—second side plate, 644—gap, 645—first deforming portion, 646—second deforming portion, 65—second locking portion;
- 7—unlocking member, 71—operating portion, 711—button section, 712—connecting section, 713—limiting step, 714—clamping block, 715—toggle section, 716—second connecting section, 72—transmission portion, 721—connecting plate, 722—lateral reinforcing plate, 723—bottom plate, 724—push plate, 73—torsion spring, 74—second operating portion, 75—second transmission portion;
- 8—internal conducting strip.

Through the above drawings, the specific embodiments of the present disclosure have been shown, which will be described in more detail later. These drawings and text descriptions are not intended to limit the scope of the concept of the present disclosure in any way, but to explain the concept of the present disclosure for a person skilled in the art by referring to the specific embodiments.

DETAILED DESCRIPTION

In order to make the objectives, technical schemes and advantages of the present disclosure clearer, a further detailed description will be made to the embodiments of the present disclosure below with reference to the accompanying drawings.

Figure 1:
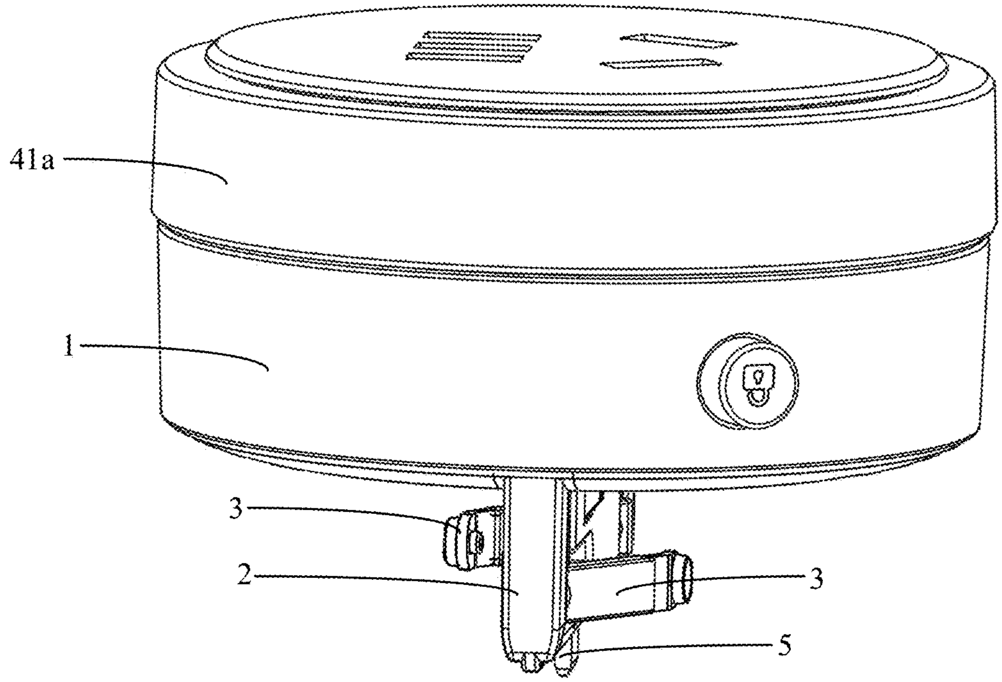
FIG. 1 is a schematic diagram of an adapter when a movable conducting strip is in an extended state according to an embodiment of the present disclosure.
Figure 2:
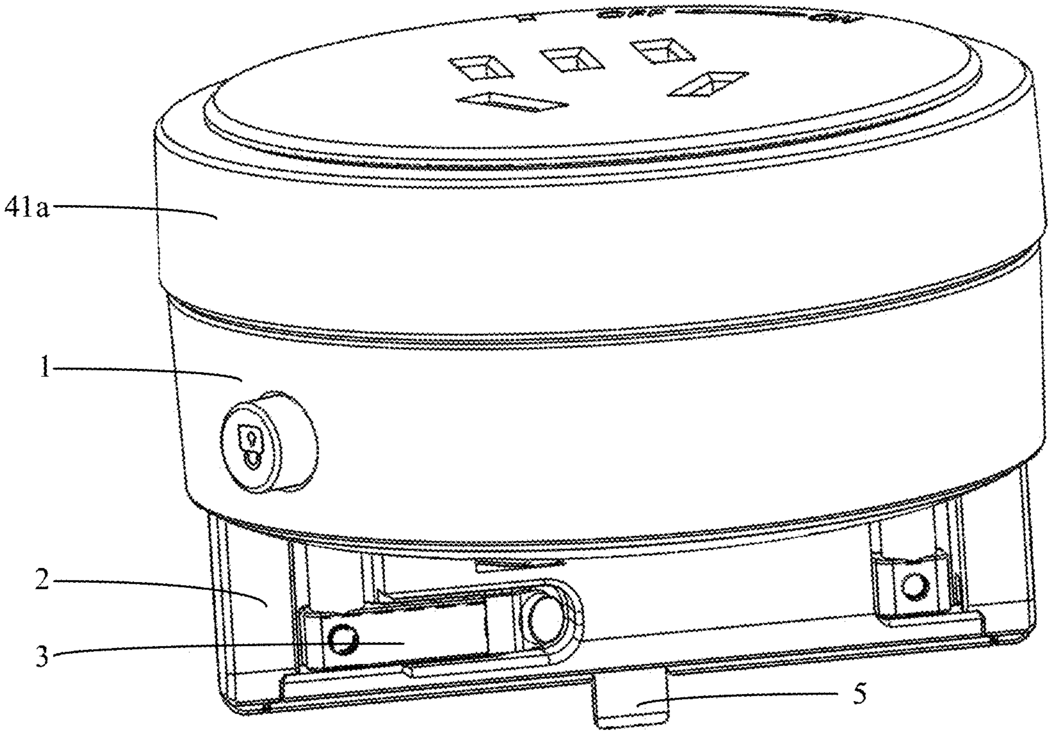
FIG. 2 is a schematic diagram of an adapter when a movable conducting strip is in a stored state according to an embodiment of the present disclosure.
Figure 3:
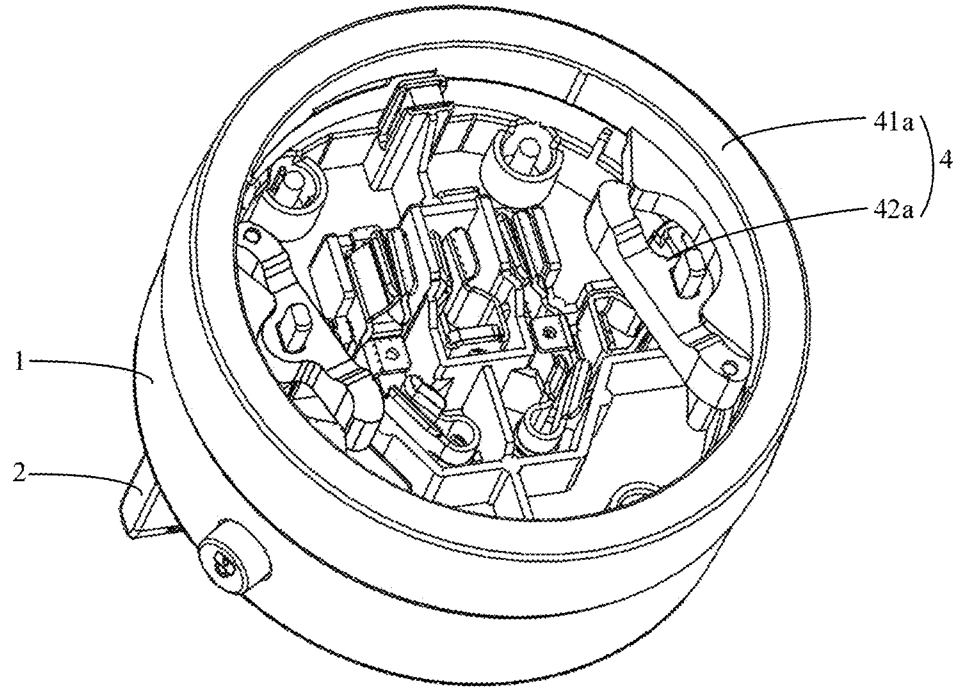
FIG. 3 is a schematic diagram of an internal structure of an adapter according to an embodiment of the present disclosure.

An embodiment of the present disclosure provides an adapter. As shown in FIGS. 1-3, the adapter includes a socket body 1, a guiding body 2, a movable conducting strip 3 and a control member 4. The guiding body 2 and the movable conducting strip 3 are both disposed on one side of the socket body 1 facing away from jacks. The control member 4 is connected to the movable conducting strip 3 in a transmission fashion, and configured to drive the movable conducting strip 3 to rotate relative to the socket body 1.

The socket body 1 has a plug bush inside, and a portion of the socket body 1, which corresponds to the plug bush, is provided with jacks. The socket body 1 may also have a safety door assembly inside. The safety door assembly is configured to block the jacks in a case that a plug is not plugged into the jacks, thereby improving the safety of the adapter. The safety door assembly may be an existing safety door assembly, and details about its specific embodiments are not repeated here.

The guiding body 2 is matched with an opening of a rail, and is configured to realize the sliding guide of the adapter in the rail.

The movable conducting strip 3 is electrically connected to the plug bush inside the socket body 1 at least in a power-taking state, and is rotatable relative to the socket body 1.

The control member 4 is configured to drive the movable conducting strip 3 to rotate relative to the socket body 1, which can be implemented in a plurality of modes. In a possible implementation, the control member 4 may include a button disposed on an outer wall of the socket body 1 and a transmission assembly connected to the button. The other end of the transmission assembly is connected to the movable conducting strip 3, such that the movable conducting strip 2 can be extended and stored relative to the guiding body 2 by pressing the button. In another possible implementation, the control member 4 includes a rotating ring and a transmission assembly, and details may refer to the following content.

The guiding body 2 and the socket body 1 provided in the embodiment of the present disclosure may be fixedly connected or rotatably connected, which is not limited in the embodiments of the present disclosure. The following two cases are exemplarily described separately.

(1) As shown in FIGS. 1-3, the guiding body 2 is fixedly connected to the socket body 1, and the movable conducting strip 3 can be driven by the control member 4 to be extended and stored relative to the guiding body 2. The guiding body 2 is elongated and fits with the opening of the rail.

As shown in FIG. 1, when the adapter needs to be powered normally, the movable conducting strip 3 is extended relative to the guiding body 2; and the movable conducting strip 3 may be in contact with a rail conducting member in the rail.

When the adapter needs to be slid, the control member 4 is operated to drive the movable conducting strip 3 to be stored relative to the guiding body 2 till the movable conducting strip 3 reaches a stored state shown in FIG. 2. At this time, the movable conducting strip 3 is detached from the rail conducting member in the rail. Then, the uncharged sliding of the adapter in the rail can be realized.

When the adapter is slid to a target position, the control member 4 is operated to drive the movable conducting strip 3 to move to the extended state and to be in contact with the rail conducting member in the rail. The adapter is in a power-taking state and can normally supply power to an electrical appliance.

A possible implementation of the control member 4 is provided below.

As shown in FIG. 3, the control member 4 includes a first rotating ring 41*a* and a first transmission assembly 42*a*. The first rotating ring 41*a* is rotatably connected to the socket body 1. One end of the first transmission assembly 42*a* is connected to an inner wall of the first rotating ring 41*a* in a transmission fashion, and the other end of the first transmission assembly 42*a* is connected (e.g., fixedly connected) to the movable connecting strip 3 in a transmission fashion.

The first transmission assembly 42*a* is configured to transfer the rotation of the first rotating ring 41*a* onto the movable conducting strip 3, and the first rotating ring 41*a* can rotate bidirectionally, such that the movable conducting sheet 3 can be extended and stored relative to the guiding body 2.

Next, the process of controlling the movable conducting strip 3 by the control member 4 is exemplarily illustrated.

As shown in FIG. 1, when the adapter needs to be powered normally, the movable conducting strip 3 is extended relative to the guiding body 2, such that the movable conducting strip 3 is in an extended state; and the movable conducting strip 3 may be in contact with the rail conducting member in the rail.

When the adapter needs to be slid, the first rotating ring 41*a* is rotated, and the first transmission assembly 42*a* drives the movable conducting strip 3 to be stored relative to the guiding body 2 till the movable conducting strip 3 reaches the stored state shown in FIG. 2. At this time, the movable conducting strip 3 is detached from the rail conducting member in the rail. Then, the uncharged sliding of the adapter in the rail can be realized.

When the adapter is slid to a target position, the first rotating ring 41*a* may be rotated in a direction opposite to the previous direction, such that the movable conducting strip 3 moves to the extended state and is in contact with the rail conducting member in the rail. Therefore, the adapter is quickly fixed in the target position. In this case, the adapter is in a power-taking state and can normally supply power to an electrical appliance.

In some possible implementations, as shown in FIG. 1, the movable conducting strip 3 includes an N-pole conducting strip and an L-pole conducting strip, which are disposed on both sides of the guiding body 2, respectively. As shown in FIG. 3, the number of the first transmission assemblies 42*a* is 2. The two first transmission assemblies 42*a* are connected to the N-pole conducting strip and the L-pole conducting strip in a transmission fashion, respectively. Therefore, the two first transmission assemblies 42*a* respectively control the conducting strips to be stored and extended relative to the guiding body 2.

As shown in FIG. 1 and FIG. 2, in addition to the N-pole conducting strip and the L-pole conducting strip, the adapter body also has an E-pole conducting member 5. The E-pole conducting member 5 may be a fixed conducting strip and protrudes from the guiding body 2 in a direction away from the socket body 1.

A possible implementation of the first transmission assembly 42*a* is provided below.

Figure 4:
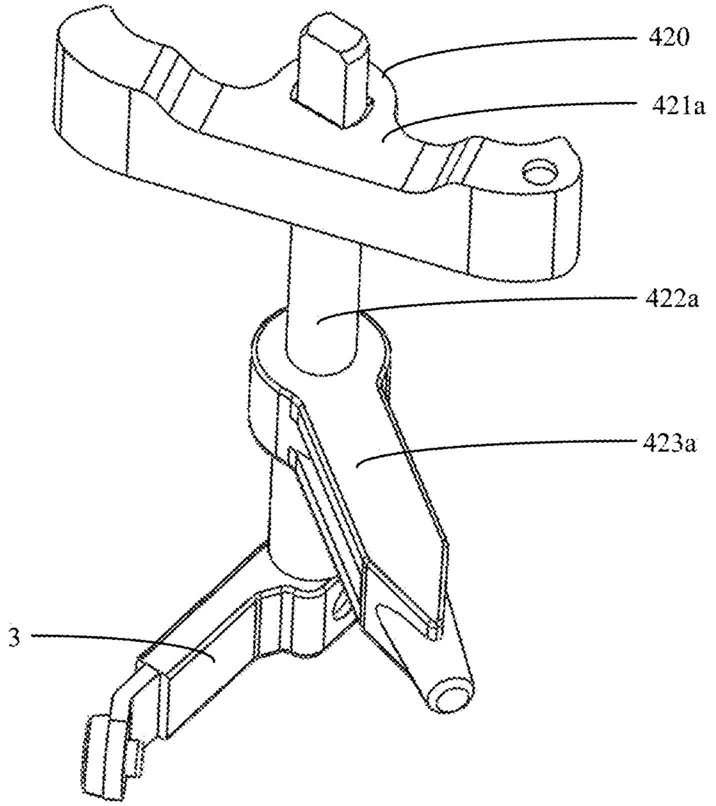
FIG. 4 is a schematic structural diagram of a first transmission assembly according to an embodiment of the present disclosure.

In a possible implementation, as shown in FIG. 4, the first transmission assembly 42*a* includes a toggle rod 421*a* and a transmission rod 422*a*. The toggle rod 421*a* is matched with the inner wall of the first rotating ring 41*a*. The transmission rod 422*a* is perpendicular to the toggle rod 421*a*, one end of the transmission rod 422*a* is fixedly connected to a mounting portion 420 of the toggle rod 421*a*, the other end of the transmission rod 422*a* is fixedly connected to the movable conducting strip 3, and the mounting portion 420 is disposed between two ends of the toggle rod 421*a*.

Figure 5:
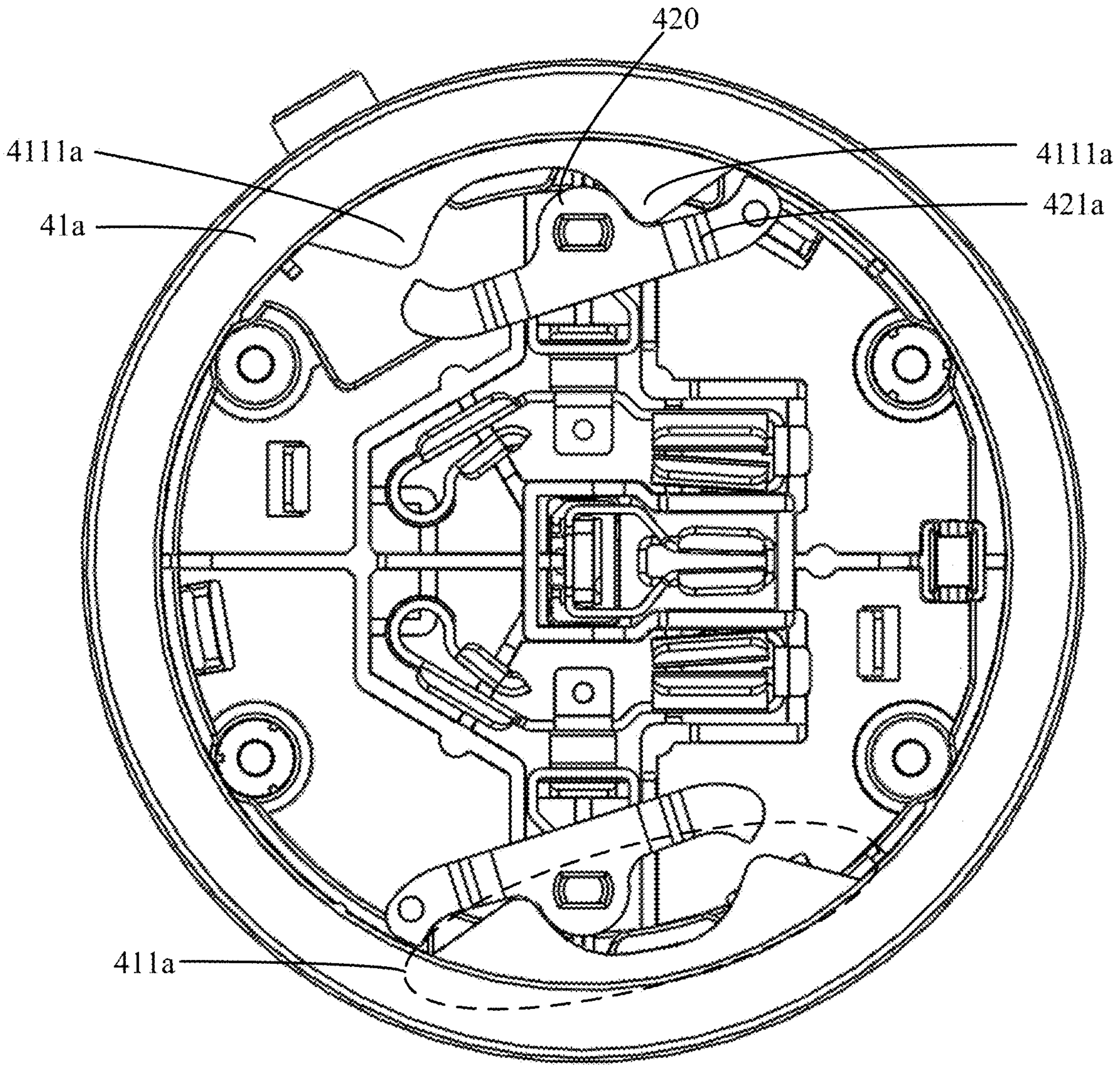
FIG. 5 is a schematic diagram of a driving structure according to an embodiment of the present disclosure.

As shown in FIG. 5, the inner wall of the first rotating ring 41*a* has a driving structure 411*a*, which includes two protrusions 4111*a* in a circumferential direction. The mounting portion 420 is disposed between the two protrusions 4111*a*, and the two protrusions 4111*a* can drive the toggle rod 421 to rotate respectively by toggling the mounting portion 420. It may be understood that, in a case that the number of the first transmission assemblies 42*a* is 2, there are also two driving structures 411*a* on the inner wall of the first rotating ring 41*a*.

A transmission principle of the first transmission assembly 42*a* is as follows:

A user rotates the first rotation ring 41*a*, and since the two protrusions 4111*a* on the inner wall of the first rotating ring 41*a* cooperate with the toggle rod 421*a*, the first rotating ring 41*a* will drive the toggle rod 421*a* to rotate, the toggle rod 421*a* in turn drives the transmission rod 422*a* to rotate, and the transmission rod 422*a* then drives the movable conducting strip 3 fixedly connected thereto to rotate. By rotating the first rotating ring 41*a* in two directions, the movable conducting strip 3 can be rotated in two directions, so that the movable conducting strip 3 can be extended and stored relative to the guiding body 2.

In order to make the movable conducting strip 3 stable in the stored state and the extended state, in a possible implementation, as shown in FIGS. 6-11, the first transmission assembly 42*a* further includes a first driving rod 423*a* and a first swing spring 424*a*. The first driving rod 423*a* is disposed between the toggle rod 421*a* and the movable conducting strip 3, and is perpendicular to the transmission rod 422*a*, one end of the first driving rod 423*a* is fixedly connected to the transmission rod 422*a*, and the other end of the first driving rod 423*a* abuts against a movable end of the first swing spring 424*a*. A fixed end of the first swing spring 424*a* abuts against an inner wall of the socket body 1, and the first swing spring 424*a* is in a compressed state. The first driving rod 423*a* has a dead center position and two limit positions, the two limit positions correspond to the stored state and the extended state of the movable conducting strip 3 respectively, and the dead center position is disposed between the two limit positions. At the dead center position, an axis of the first driving rod 423*a* coincides with an axis of the first swing spring 424*a*.

Figure 6:
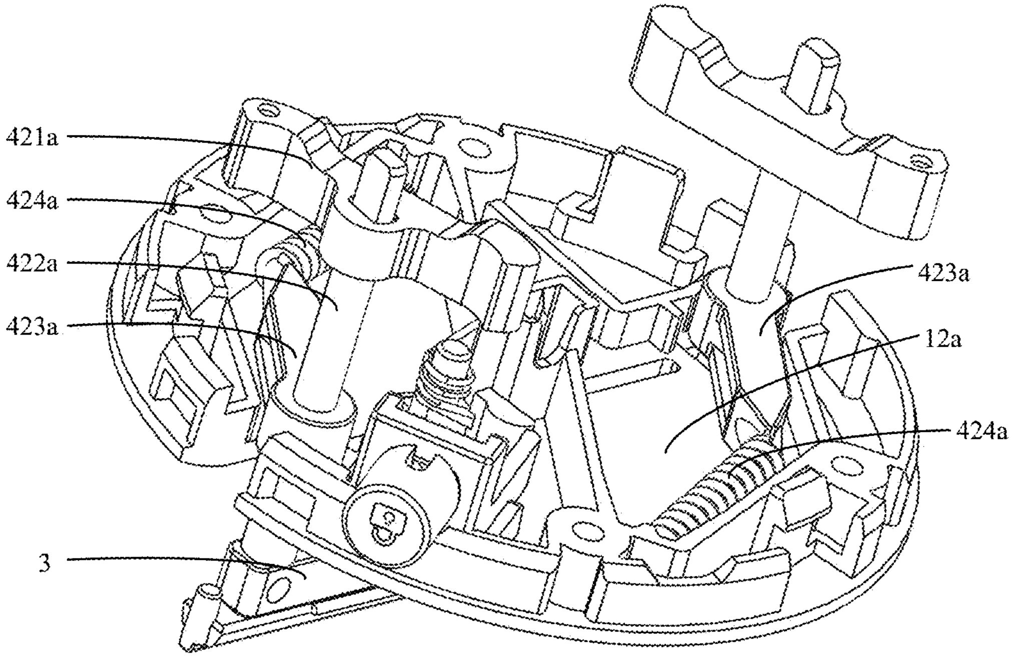
FIG. 6 is a schematic structural diagram when a driving rod is at an limit position according to an embodiment of the present disclosure.
Figure 7:
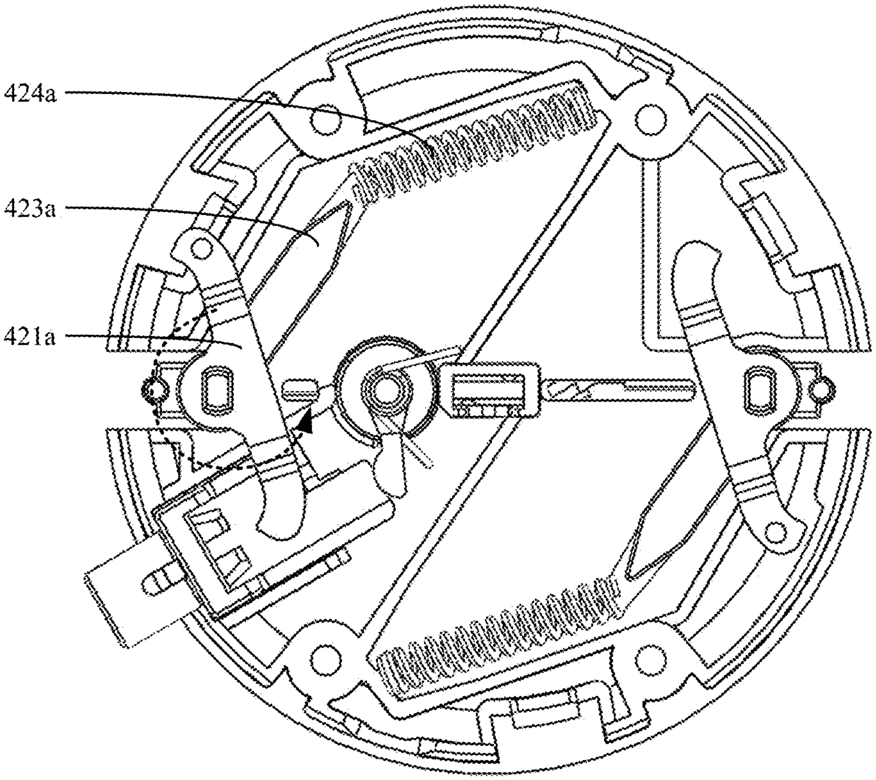
FIG. 7 is a schematic structural diagram when a driving rod is at an limit position according to an embodiment of the present disclosure.

FIG. 6 and FIG. 7 are schematic diagrams showing the first driving rod 423*a* is at one limit position. The movable conducting strip 3 is in the stored state at this limit position. This limit position may be referred to as a storage limit position.

Figure 8:
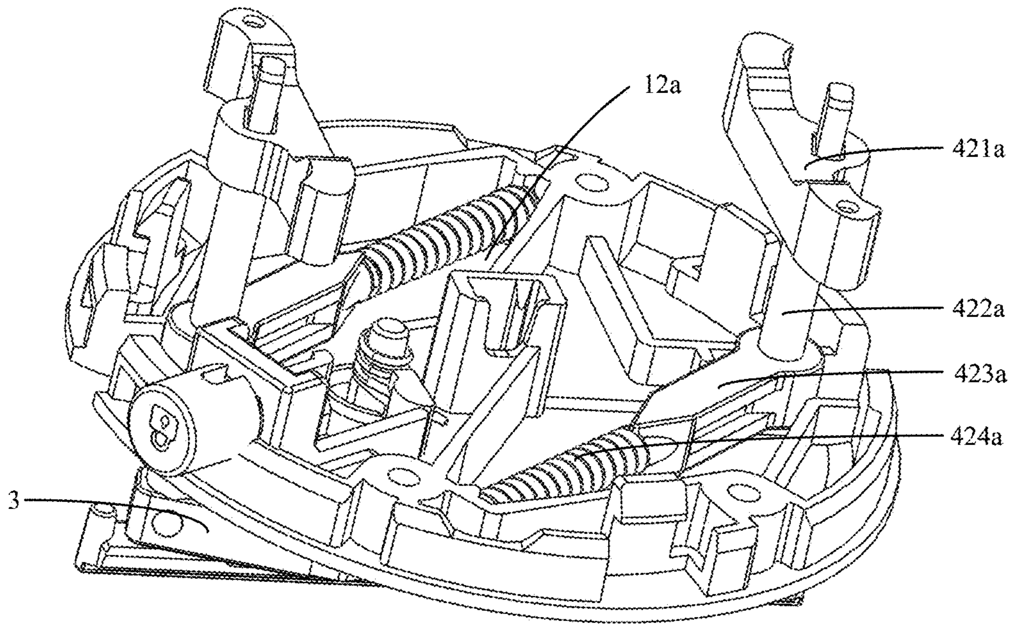
FIG. 8 is a schematic structural diagram when a driving rod is at a dead center position according to an embodiment of the present disclosure.
Figure 9:
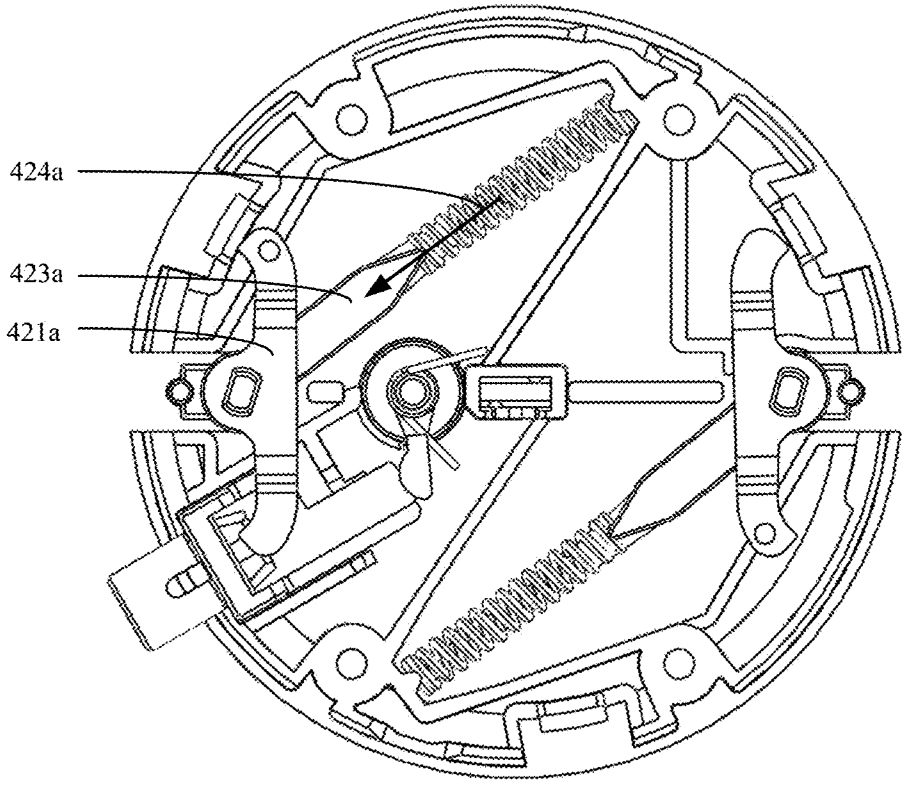
FIG. 9 is a schematic structural diagram when a driving rod is at a dead center position according to an embodiment of the present disclosure.

FIG. 8 and FIG. 9 are schematic diagrams showing the first driving rod 423*a* is at the dead center position. At the dead center position, the axis of the first driving rod 423*a* coincides with the axis of the first swing spring 424*a*.

Figure 10:
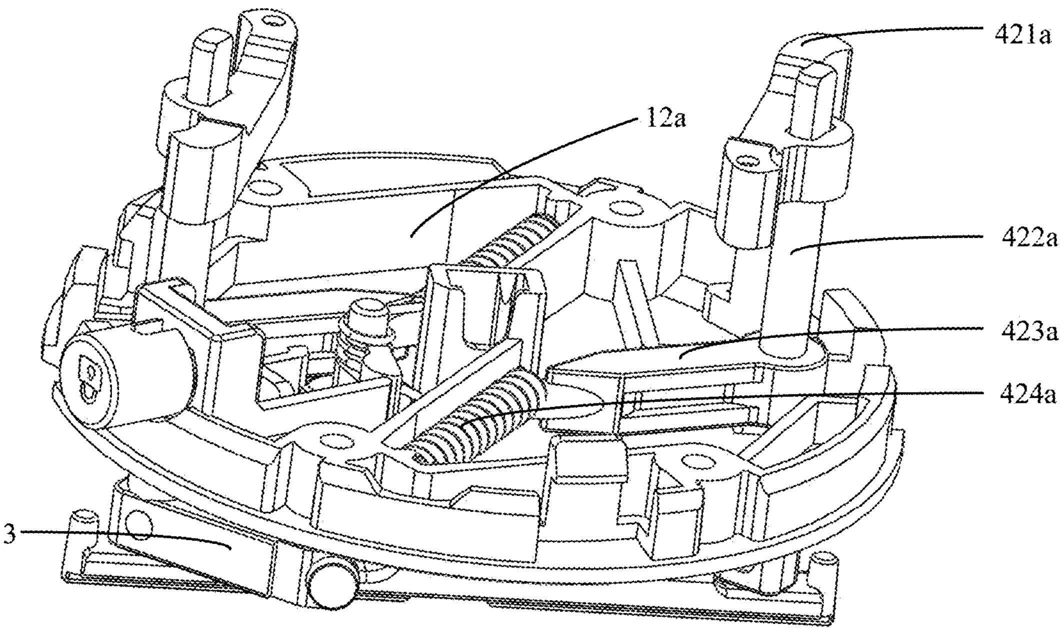
FIG. 10 is a schematic structural diagram when a driving rod is at another limit position according to an embodiment of the present disclosure.
Figure 11:
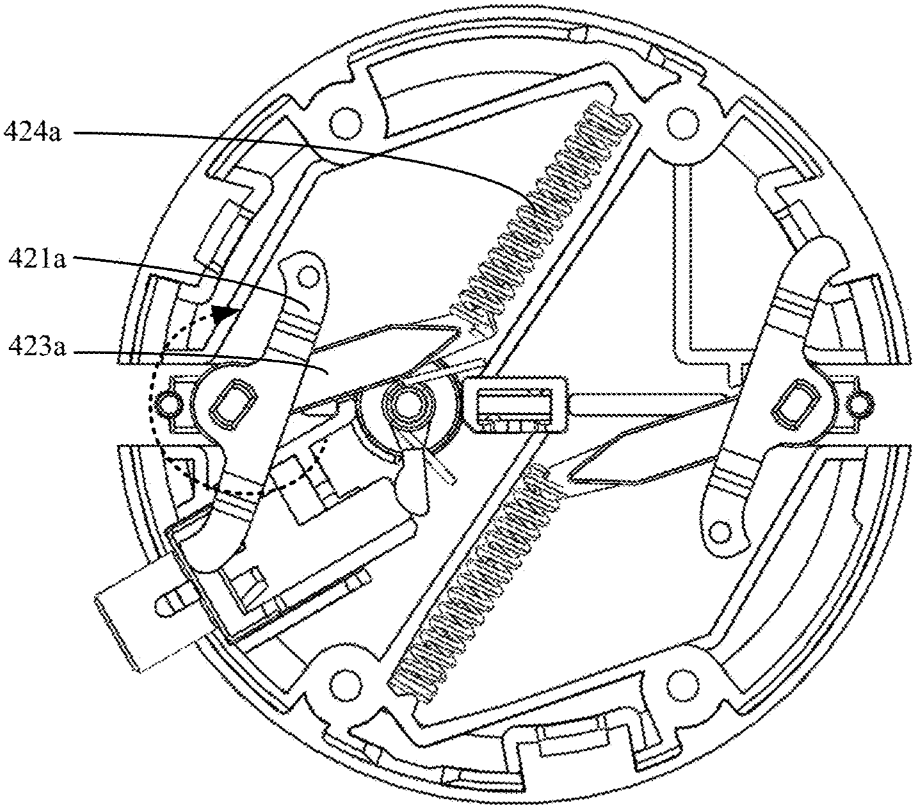
FIG. 11 is a schematic structural diagram when a driving rod is at another limit position according to an embodiment of the present disclosure.

FIG. 10 and FIG. 11 are schematic diagrams showing the first driving rod 423*a* is at the other limit position. The movable conducting strip 3 is in the extended state at this limit position. This limit position may be referred to as an extending limit position.

Next, in conjunction with FIGS. 6-11, a working state of the first driving rod 423*a* and the first swing spring 424*a* during the movement of the first driving rod 423*a* from the storage limit position to the extending limit position will be described.

As shown in FIG. 6 and FIG. 7, the first driving rod 423*a* is at the storage limit position. In this case, the movable conducting strip 3 is in the stored state and is in contact with the guiding body 2. Meanwhile, since the first swing spring 424*a* is in the compressed state, it will apply a pushing force to the first driving rod 423*a*. This pushing force causes the first driving rod 423*a* to have a tendency to rotate in a direction indicated by an arrow in FIG. 7. Therefore, the first driving rod 423*a* drives the movable conducting strip 3 to be closely clung to the guiding body 2, and the movable conducting strip 3 is in a stably stored state under the pushing force of the first swing spring 424*a*.

The user rotates the first rotating ring 41*a*, such that the first driving rod 423*a* moves toward the extending limit position. In this process, the first driving rod 423*a* needs to overcome the pushing force of the first swing spring 424*a*. It may be understood that, when the first driving rod 423*a* has not moved to the dead center position as shown in FIG. 8 and FIG. 9, the first driving rod 423*a* always has a tendency to rotate in a direction indicated by the arrow in FIG. 7 under the pushing force of the first swing spring 424*a*. Therefore, if the user no longer applies an acting force to the first rotating ring 41*a* between the storage limit position and the dead center position, the first driving rod 423*a* will always return to the storage limit position automatically under the pushing force of the first swing spring 424*a*.

The user continues to rotate the first rotating ring 41*a*, such that the first driving rod 423*a* moves to the dead center position as shown in FIG. 8 and FIG. 9. At the dead center position, since the axis of the first driving rod 423*a* coincides with the axis of the first swing spring 424*a*, the first driving rod 423*a* no longer has a tendency to rotate, with its force direction being indicated by an arrow direction in FIG. 9. If the user no longer applies an acting force to the first rotating ring 41*a* just at the dead center position, the first driving rod 423*a* will be stabilized at the dead center position.

If the first rotating ring 41*a* continues to be rotated, the first driving rod 423*a* will pass the dead center position. Under the pushing force of the first swing spring 424*a*, the first driving rod 423*a* always has a tendency to rotate in a direction indicated by an arrow in FIG. 11. Therefore, if the user no longer applies an acting force to the first rotating ring 41*a* between the extending limit position and the dead center position, the first driving rod 423*a* will always return to its extending limit position automatically, as shown in FIG. 10 and FIG. 11, under the pushing force of the first swing spring 424*a*.

It may be seen from the above description that the first driving rod 423*a* has three stable positions totally, which are the storage limit position, the extending limit position, and the dead center position. The dead center position is disposed between the storage limit position and the extending limit position. In the case of no external force, the first driving rod 423*a* will automatically return to and is stabilized at the storage limit position when it is at any position between the dead center position and the storage limit position, and will automatically return to and is stabilized at the extending limit position when it is at any position between the dead center position and the extending limit position.

In addition, due to the characteristic of automatic return of the first driving rod 423*a*, the first rotating ring 41*a* does not need to complete the entire movement of driving the first driving rod 423*a* from the storage limit position to the extending limit position. The first rotating ring 41*a* only needs to be able to drive the first driving rod 423*a* to move to pass the dead center position from the storage limit position, and to pass the dead center position from the extending limit position. Moreover, the operating feel of the user is also enhanced by means of the automatic return design of the first driving rod 423*a*.

As shown in FIGS. 6-11, the socket body 1 has a first limiting groove 12*a*, and the first driving rod 423*a* and the first swing spring 424*a* are disposed in the first limiting groove 12*a*. The first limiting groove 12*a* has a flared opening. The first swing spring 424*a* can swing in a space defined by the first limiting groove 12*a*.

As shown in FIG. 6 and FIG. 7, when the first driving rod 423*a* moves to the storage limit position, the first swing spring 424*a* is in contact with one groove wall of the first limiting groove 12*a*, and the movable conducting strip 3 is in contact with the guiding body 2, such that the movable conducting strip 3 is relatively stable in the stored state.

As shown in FIG. 10 and FIG. 11, when the first driving rod 423*a* moves to the extending limit position, the first swing spring 424*a* is in contact with the other groove wall of the first limiting groove 12*a*.

As shown in FIGS. 6, 8 and 10, the transmission rod 422*a* runs through one side of the socket body 1 facing away from the jacks. A first portion of the transmission rod 422*a* is disposed inside the socket body 1, and a second portion of the transmission rod 422*a* is disposed outside the socket body 1. Optionally, in order to make the rotation of the transmission rod 422*a* more stable, an end of the second portion of the transmission rod 422*a* may be rotatably connected to the guiding body 2.

The implementation of the electrical connection between the movable conducting strip and a first plug bush 11*a* in the socket body 1 is not limited in the embodiments of the present disclosure.

Figure 12:
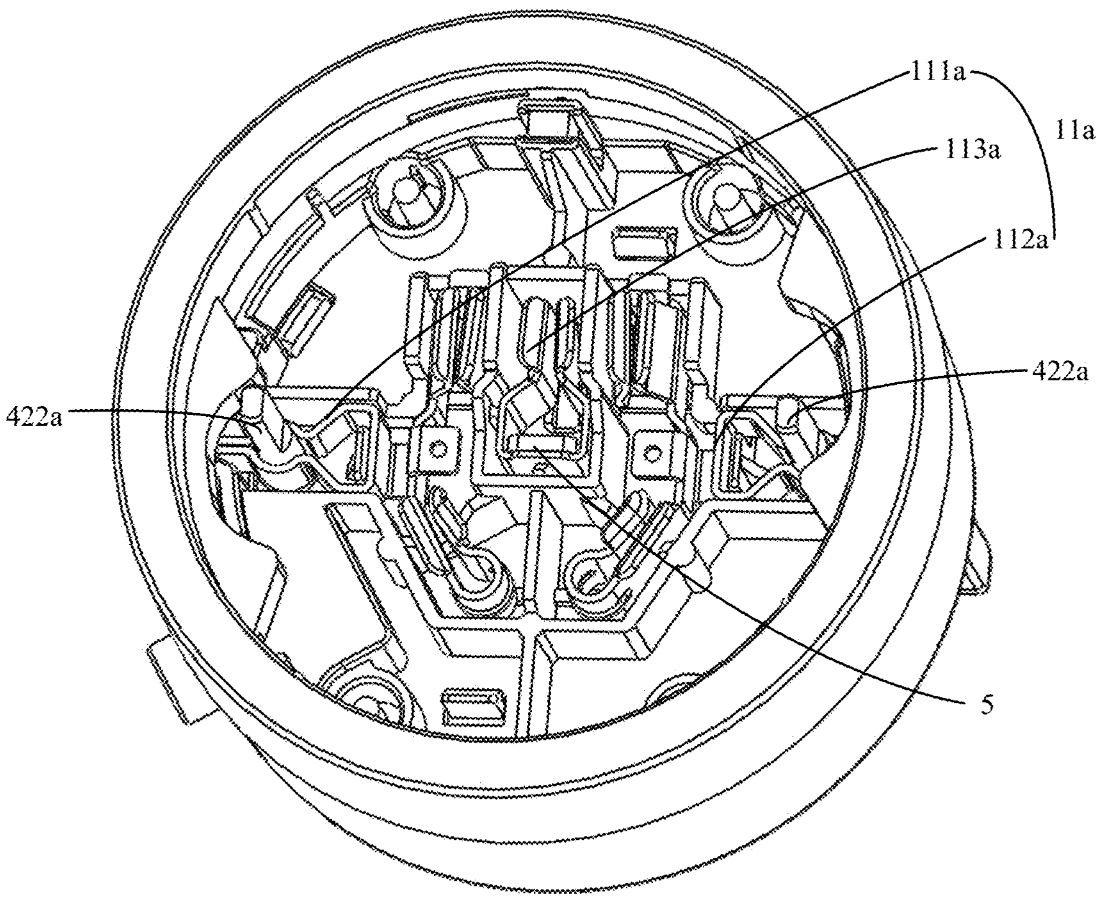
FIG. 12 is a schematic diagram of an internal structure of an adapter according to an embodiment of the present disclosure.

In an exemplary embodiment, as shown in FIG. 12, a first N-pole plug bush 111*a* and a first L-pole plug bush 112*a* in the first plug bush 11*a* of the socket body 1 sleeve the corresponding transmission rods 422*a* respectively, and are electrically connected to the corresponding transmission rods 422*a* respectively. A first E-pole plug bush 113*a* in the socket body 1 sleeves a E-pole conducting member 5.

The transmission rods 422*a* may be made of a metal material, e.g., copper. The transmission rod 422*a* corresponding to the first N-pole plug bush 111*a* refers to a transmission rod 422*a* fixedly connected to an N-pole plug sheet; and the transmission rod 422*a* corresponding to the first L-pole plug bush 112*a* refers to a transmission rod 422*a* fixedly connected to an L-pole plug sheet.

According to the scheme shown in the embodiment of the present disclosure, the first N-pole plug bush 111*a* and the first L-pole plug bush 112*a* sleeve the corresponding transmission rods 422*a* respectively, and are electrically connected to the corresponding transmission rods 422*a* respectively, such that the first N-pole plug bush 111*a* is electrically connected to the N-pole conducting strip, and the first L-pole plug bush 112*a* is electrically connected to the L-pole conducting strip.

In addition, by the design that each plug bush sleeves the corresponding transmission rods 422, a contact area between the plug bush and the transmission rod 422*a* is larger, which can ensure the effective contact between the plug bush and the transmission rod 422*a* and the stability of electric connection during the rotation process of the transmission rod 422*a*. The above-mentioned plug bushes refer to the first N-pole plug bush 111*a* and the first L-pole plug bush 112*a*.

Figure 13:
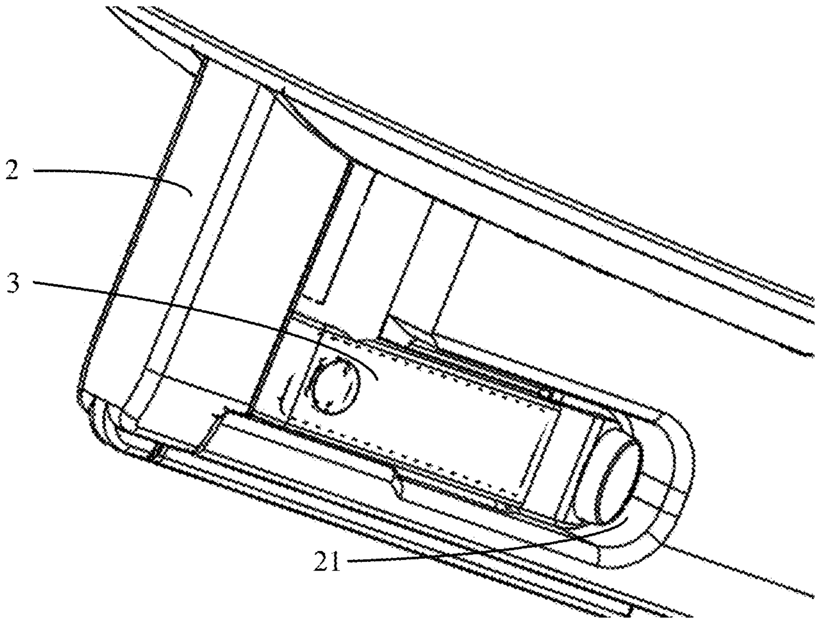
FIG. 13 is a schematic diagram of an accommodating groove according to an embodiment of the present disclosure.

In a possible implementation, as shown in FIG. 13, two side walls of the guiding body 2 are respectively provided with an accommodating groove 21, and the accommodating groove 21 fits with the corresponding movable conducting strip 3. The accommodating groove 21 is configured to store the movable conducting strip 3.

By providing the accommodating grooves 21, the movable conducting strip 3 is more stable in the stored state, and the adapter is also more attractive in appearance.

In order to prevent the adapter from being detached from the rail when the movable conducting strip 3 is in the stored state, the adapter provided by the embodiment of the present disclosure may further include a locking member 6 and an unlocking member 7.

Figure 14:
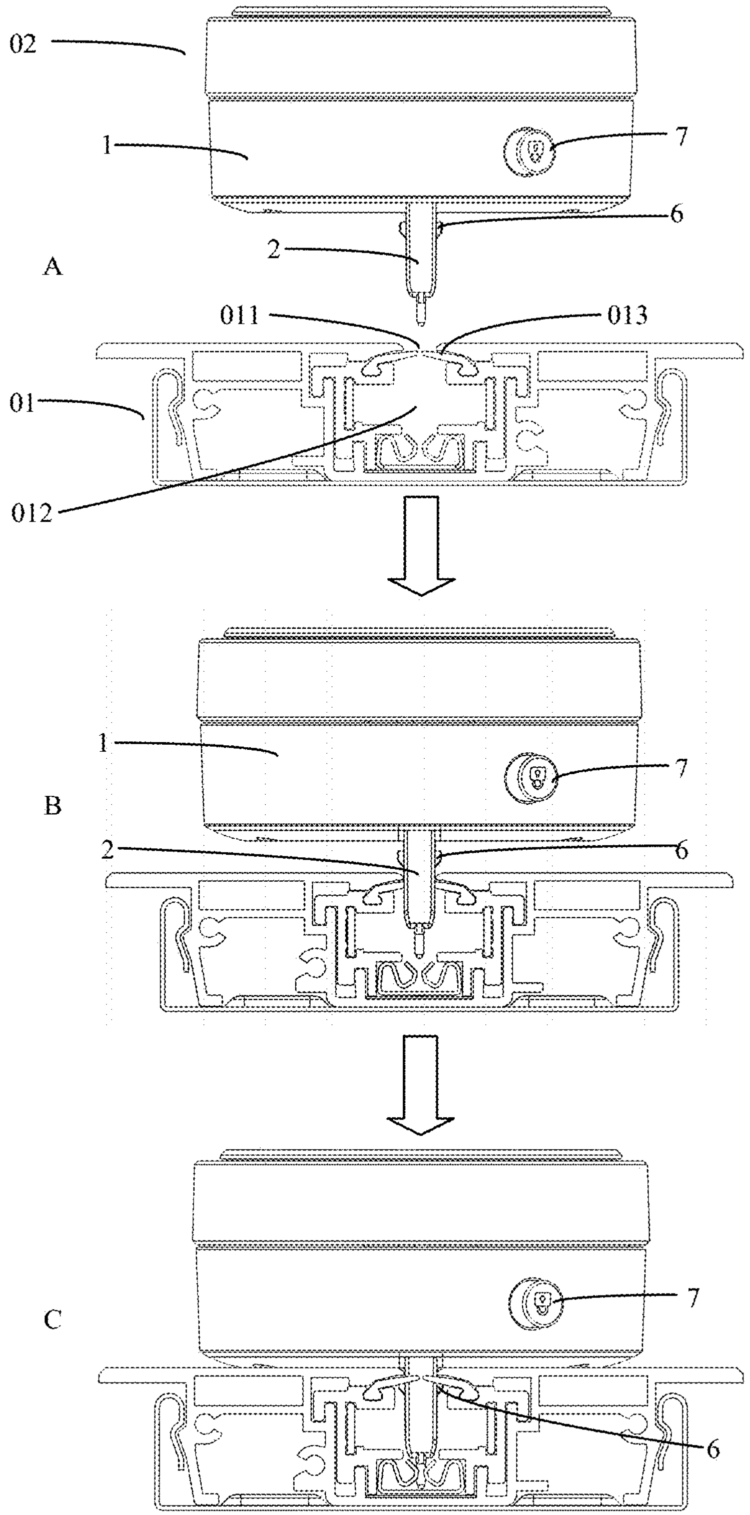
FIG. 14 is a schematic diagram of a process of plugging an adapter into a rail according to an embodiment of the present disclosure.

As shown in FIG. 14, the locking member 6 runs through one side of the socket body 1 facing away from the jacks, and is configured to be limited inside a rail 01 in a locked state and to be released from the rail 01 in an unlocked state. The unlocking member 7 is connected to the socket body 1, and configured to enable the locking member 6 to be switched between the locked state and the unlocked state.

The locking member 6 can be switched between the locked state and the unlocked state by operating the unlocking member 7. When the locking member 6 is in the locked state, the locking member 6 is limited inside the rail 01 (for the locked state, please refer to a state C in FIG. 14). In this way, the adapter will not fall off from the rail 01, so that the adapter is locked inside the rail 01.

When the adapter needs to be plugged into and pulled out from the rail 01, the unlocking member 7 is operated to switch the locking member 6 from the locked state to the unlocked state. In this way, the locking member 6 is released from the rail 01, and can freely enter and exit from an opening 011 of the rail 01, so that the adapter can be plugged in and pulled out smoothly.

In a possible implementation, the locking member 6 provided by the embodiment of the present disclosure may be switched between the locked state and the unlocked state by means of rotation.

Figure 15:
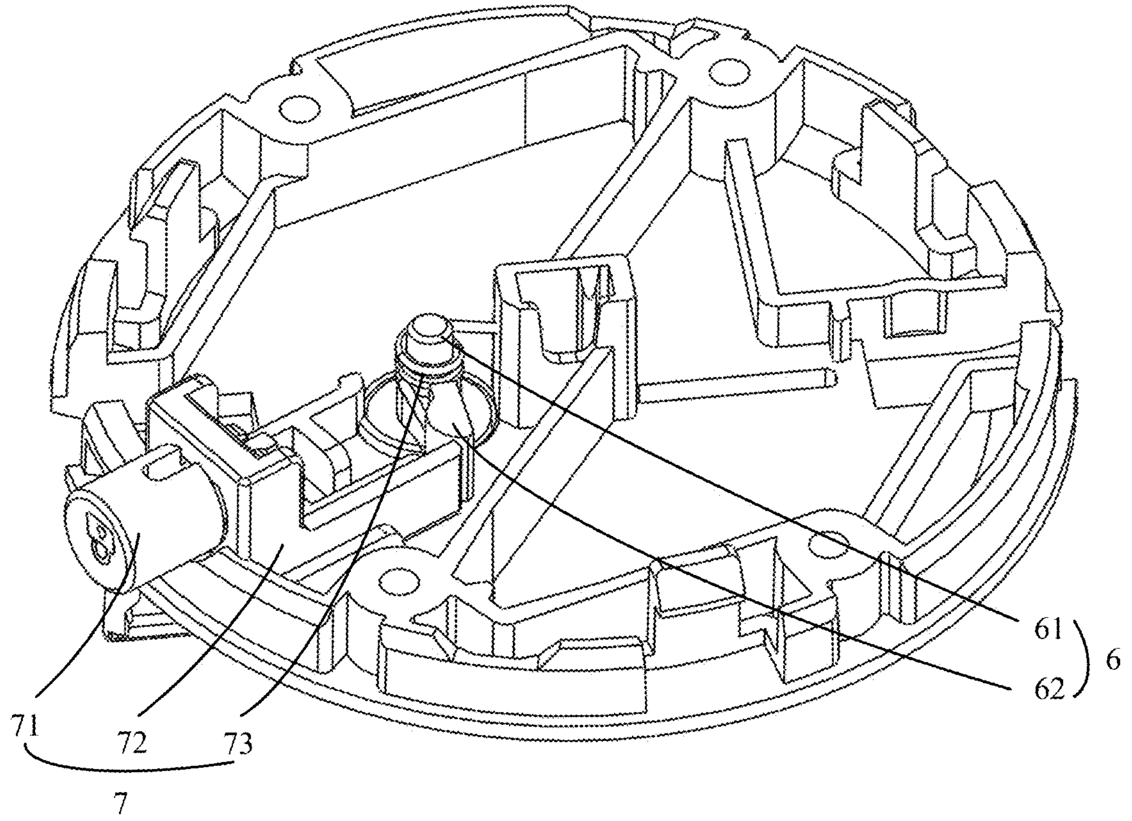
FIG. 15 is a schematic diagram of a locking member and an unlocking member according to an embodiment of the present disclosure.
Figure 16:
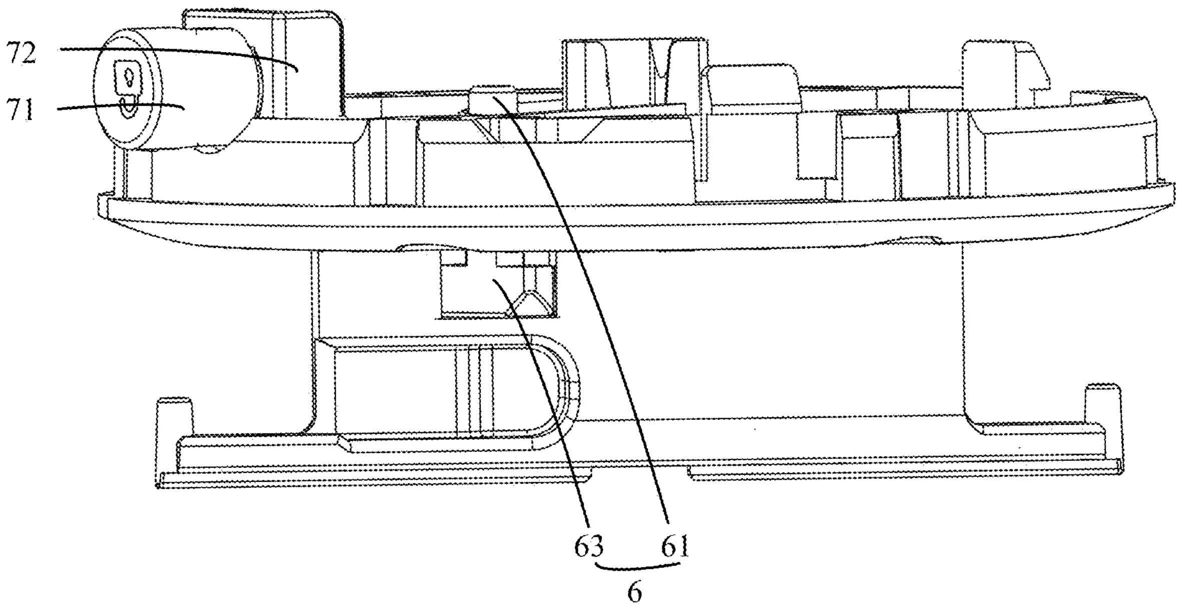
FIG. 16 is a schematic diagram of a locking member and an unlocking member according to an embodiment of the present disclosure.

As shown in FIG. 15 and FIG. 16, the locking member 6 includes a rotating portion 61, a connecting portion 62 and a locking portion 63. The rotating portion 61 runs through one side of the socket body 1 facing away from the jacks, and is rotatable. A first end of the connecting portion 62 is connected to one end of the rotating portion 61 disposed inside the socket body 1, and a second end of the connecting portion 62 is connected to the unlocking member 7. The locking portion 63 is connected to one end of the rotating portion 61 disposed outside the socket body 1, and is switched between the locked state and the unlocked state by means of rotation.

As shown in FIG. 16, the sidewall of the guiding body 2 is provided with a hole. The locking portion 63 is disposed in the hole and can be extended and stored relative to the guiding body 2 by means of rotation. When the locking portion 63 is extended relative to the guiding body 2, the locking portion 63 is in a locked state. When the lock portion 63 is stored relative to the guiding body 2, the locking portion 63 is in an unlocked state.

For example, the rotating portion 61 is a cylindrical body. A via hole is formed at a position corresponding to the locking member 6 on one side of the socket body 1 facing away from the jacks. The rotating portion 61 passes through the via hole and is rotatable in the via hole.

The first end of the connecting portion 62 is connected to one end of the rotating portion 61 disposed inside the socket body 1, and the second end of the connecting portion 62 is connected to the unlocking member 7. Since the locking portion 63 is connected to one end of the rotating portion 61 disposed outside the socket body 1, when the unlocking member 7 is operated to act on the connecting portion 62, the connecting portion 62 can transfer this action to the rotating portion 61 to cause the rotating portion 61 to rotate, and the rotating portion 61 in rotation then drives the locking portion 63 to rotate, thereby switching the locking portion 63 between the locked state and the unlocked state.

The structure of the connecting portion 62 is adaptively designed based on the structures of the unlocking member 7 and the rotating portion 61, as long as the above-mentioned connection can be ensured. For example, the first end of the connecting portion 62, which is connected to the rotating portion 61, is of a sleeve-like structure. In this way, the connection can be achieved by sleeving the rotating portion 61 with the connecting portion 62. The second end of the connecting portion 62, which is connected to the unlocking member 7, may be in the shape of a circular arc block, a rectangular block, or an angular block. In addition, the connection modes between the second end of the connecting portion 62 and the unlocking member 7 include: fixed connection or non-fixed connection (e.g., contact only). For example, the connection mode between the connecting portion 62 and the unlocking member 7 is contact connection, clamping connection, magnetic connection, or the like.

Figure 17:
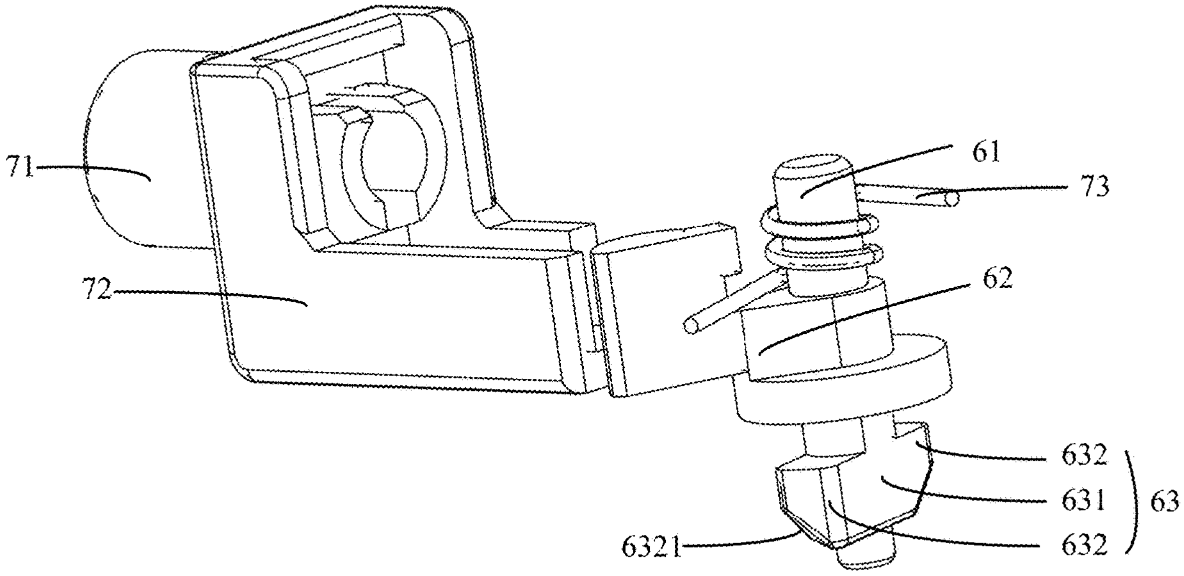
FIG. 17 is a schematic diagram of a locking member and an unlocking member according to an embodiment of the present disclosure.

In a possible implementation, as shown in FIG. 17, the locking portion 63 includes a locking portion body 631 and locking blocks 632. The locking portion body 631 is connected to the rotating portion 61. The locking blocks 632 are connected to the sidewall of the locking portion body 631, and are stopped by inner surfaces of top walls, disposed on both sides of the opening 011, of the rail 01 in a locked state. In other words, the locking blocks 632 and the inner surfaces of the top walls on the lateral portions of the opening 011 of the rail 01 are stopped mutually to achieve locking.

Further, as shown in FIG. 17, the locking portion 63 includes two locking blocks 632. In addition, the two locking blocks 632 are connected to opposite sidewalls of the locking portion body 631, that is, the two locking blocks 632 are respectively located on both sides of the locking portion body 631. In this way, the two locking blocks 632 and the inner surfaces of the top walls disposed on both sides of the opening 011 of the rail 01 are stopped mutually, which facilitates improving a limiting effect.

In an embodiment of the present disclosure, a connection mode between the locking portion body 631 and the second end of the rotating portion 61 includes, but is not limited to: integrally formed connection, threaded connection, clamping connection, or the like.

The locking blocks 632 are connected to the locking portion body 631 in an integrally formed mode to acquire sufficient connection strength. The structure of the locking blocks 632 includes, but is not limited to: a rectangular block shape, an arc block shape, an angular block shape, and some special-shaped block shapes with irregular geometric shapes.

In a possible implementation, as shown in FIG. 17, the end of each locking block 632 away from the socket body 1 has a guiding surface 6321. The guiding surface 6321 is configured to contact an inner wall of the opening 011 when the locking portion 63 enters the opening 011 of the rail, such that the locking member 63 rotates from the locked state to the unlocked state.

The guiding surfaces 6321 are opposite to the inner walls of the opening 011 of the rail 01. In addition, the structure of the guiding surfaces 6321 meets the following requirements: in the locked state, once the locking blocks 632 are in contact with the inner walls of the opening 011 of the rail 01, the inner walls of the opening 011 of the rail 01, based on such contact action, press the locking blocks 632, such that the locking portion 63 can rotate and smoothly enter the opening 011. In the process of entering the opening 011, the locking blocks 632 are always pressed by the inner walls of the opening 011 to continuously rotate the locking portion 63 until the locking portion 63 rotates to the unlocked state. It may be understood that the two guiding surfaces 6321 of the two locking blocks 632 face two inner walls of the opening 011, respectively, such that the locking portion 63 can be guaranteed to rotate smoothly when the two inner walls press the two locking blocks 632 respectively.

For example, the guiding surface 6321 is an inclined surface or an arc surface. In addition, an inclination direction of the inclined surface or an arc direction of the arc surface is a rotation direction of the locking blocks 632 so as to guide the locking blocks 632 to rotate.

It can be seen that, by providing the guiding surface 6321 at the end of each locking block 632, the guiding surface 6321 is in contact the corresponding inner wall of the opening 011 when the locking portion 63 enters the opening 011 of the rail 01, so as to drive the locking portion 63 to rotate, such that the locking portion 63 automatically rotates from the locked state to the unlocked state, which facilitates improving the user experience. That is, it is unnecessary to operate the unlocking member 7 when the adapter is plugged into the rail 01. That is, the locking portion 63 can rotate to the unlocked state automatically, without any additional action, such that the adapter can be plugged smoothly, while a good plugging feel can be acquired.

The unlocking member 7 is adaptively designed according to the structure of the locking member 6, as long as the unlocking member 7 can drive the locking member 6 to rotate when the unlocking member 7 is operated.

The structure of the unlocking member 7 is exemplarily described below.

Figure 18:
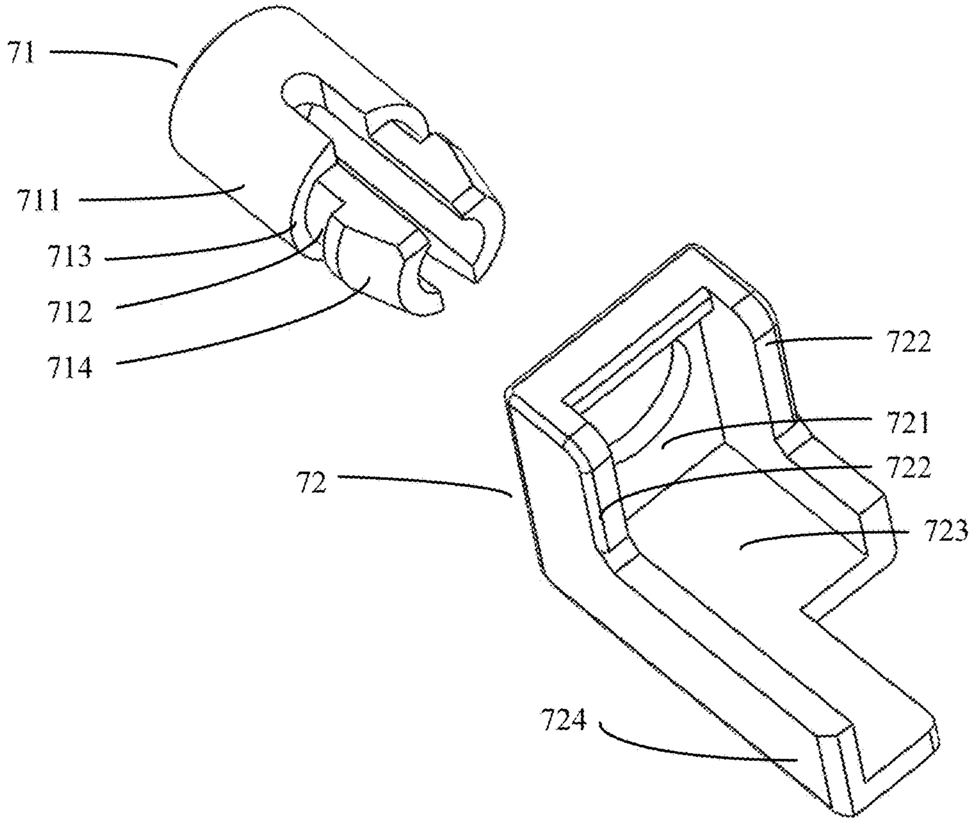
FIG. 18 is a schematic diagram of an unlocking member according to an embodiment of the present disclosure.
Figure 20:
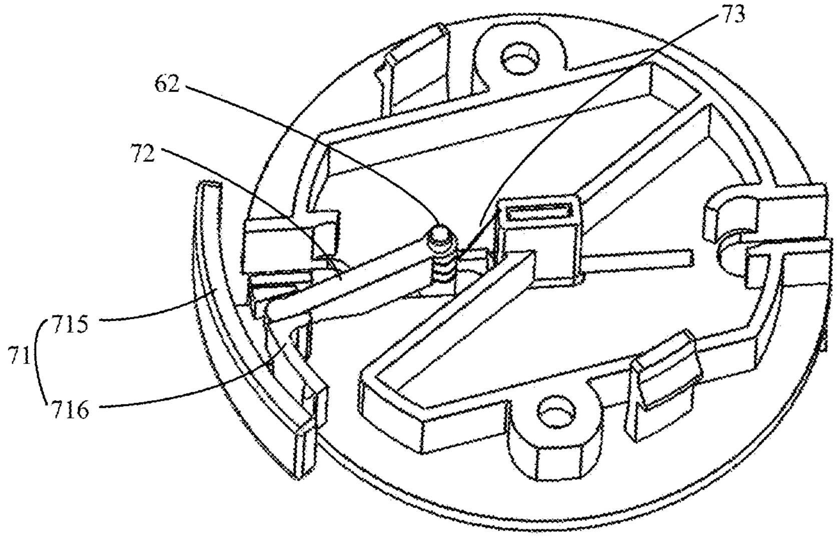
FIG. 20 is a schematic diagram of a partial structure of an adapter unlocked by toggling according to an embodiment of the present disclosure.

In a possible implementation, as shown in FIG. 18 and FIG. 20, the unlocking member 7 includes an operating portion 71 and a transmission portion 72. The operating portion 71 is movably connected to the sidewall of the socket body 1. A first end of the transmission portion 72 is connected to the operating portion 71, and a second end of the transmission portion 72 is connected to the connecting portion 62.

By means of operating, for example, pressing the operating portion 71, the transmission portion 72 transfers a force to the connecting portion 62 of the locking member 6 so as to drive the connecting portion 62 to rotate. The connecting portion 62 in rotation drives the locking portion 63 to rotate at the same time, such that the locking portion 63 is switched from the locked state to the unlocked state.

The operation modes of the operating portion 71 include, but are not limited to: a pressing mode, a toggling mode, etc., which are exemplarily described below, respectively.

As an example, as shown in FIGS. 14-18, the operating portion 71 is a button, which is operated by means of pressing. The sidewall of the socket body 1 is provided with a hole or a slot for accommodating the operating portion 71 of the button structure. The operating portion 71 may be movably disposed inside the hole or slot by means of pressing.

In the embodiment of the present disclosure, the sidewall of the socket body 1 is also provided with a corresponding hole for accommodating the operating portion 71 of the button structure, such that the operating portion 71 can be pressed. The operating portion 71 is disposed at a position which is most suitable to be pressed by the user's thumb, so as to conform to ergonomics and unlock the adapter in the most comfortable state, so that the unlocking process is simple and smooth.

A detachable connection mode is adopted between the operating portion 71 and the transmission portion 72 to facilitate the assembly. For example, the detachable connection mode is a threaded connection mode, a clamping connection mode, or the like.

Taking the clamping connection mode as an example, as shown in FIG. 18, the operating portion 71 includes a button section 711 and a connecting section 712 that are connected in sequence. An outer diameter of the connecting section 712 is smaller than that of the button section 711, thereby forming a limiting step 713 at the connection therebetween. The connecting section 712 is of an elastic structure that can be telescopic in a radial direction. For example, the connecting section 712 is in a sleeve-shaped, and the sidewall where the connecting section 712 is disposed is provided with a plurality of strip-shaped holes which extend axially and are arranged in a circumferential direction, such that the connecting section 712 of the operating portion 71 can be telescopic in the radial direction. A clamping block 714 is disposed on an outer side of the sidewall of a free end of the connecting section 712 away from the button section 711. Correspondingly, a clamping hole is formed in a portion of the transmission portion 72, which is connected to the operating portion 71. In application, the connecting section 712 of the operating portion 71 is plugging into the clamping hole. Under the press of an inner wall of the clamping hole or a manual press, the connecting section 712 is compressed in a radial direction, such that the connecting section 712 passes through the clamping hole until a wall of the transmission portion 72 facing the limiting step 713 is stopped by the limiting step 713. Then, the connecting section 712 is not pressed and automatically resets based on its elasticity. At this time, a wall of the transmission portion 72 facing away from the limiting step 713 is stopped by the clamping block 714, so that the transmission portion 72 is limited between the limiting step 713 and the clamping block 714. In this way, the operating portion 71 may be in clamping connection to the transmission portion 72.

In order to improve the stability of the transmission portion 72, the transmission portion 72 may also be connected to the socket body 1. For example, an insertion slot is formed in the socket body 1, such that the transmission portion 72 is plugged into the insertion slot.

When the operating portion 71 is a button, the transmission portion 72 is such configured that it can transfer a pressing force of the button to the locking portion 63 when the button is pressed, and thereby the locking portion 63 is rotated.

For example, as shown in FIG. 18, the transmission portion 72 includes a connecting plate 721, two lateral reinforcing plates 722, a bottom plate 723 and a push plate 724. The connecting plate 721 is disposed in a direction perpendicular to the operating portion 71. The two lateral reinforcing plates 722 are respectively connected to two opposite side ends of the connecting plate 721 and extend in a direction away from the operating portion 71. The bottom plate 723 is vertically connected to a bottom end of the connecting plate 721 and extends in a direction away from the operating portion 71. One end of the push plate 724 is connected to the end of the bottom plate 723 away from the connecting plate 721, and the other end of the push plate 724 is connected to the second end of the connecting portion 62 (for the specific connection mode, please refer to the above description of the connection mode of the connecting portion 62 and the unlocking member 7).

In a possible implementation, as shown in FIG. 17, the unlocking member 7 further includes a torsion spring 73. The torsion spring 73 is disposed inside the socket body 1, and sleeves the rotating portion 62. Two ends of the torsion spring 73 abut against the inner wall of the socket body 1 and the connecting portion 61, respectively. The torsion spring 73 is configured to maintain the locking portion 63 in the locked state.

As shown in FIG. 17, a spring body of the tension spring 73 sleeves the rotating portion 61 of the locking member 6. One torsion arm of the torsion spring 73 is in contact with the connecting portion 62 of the locking member 6, and the other torsion arm of the torsion spring 73 abuts against the inner wall of the socket body 1. In this way, when the torsion spring 73 is in an initial state, its elastic force can maintain the locking portion 63 in the locked state. When an external force acts on the operating portion 71 and causes the connecting portion 62 to rotate, the connecting portion 62 presses the torsion arm that is in contact therewith to deform this torsion arm. The connecting portion 62 overcomes the elastic force of the torsion spring 73 to automatically rotate the locking portion 63 from the locked state to the unlocked state.

It can be seen that, according to the embodiment of the present disclosure, by arranging the tension spring 73 and by means of operating, for example, pressing the operating portion 71, the transmission portion 72 transfers this pressing force to the connecting portion 62 of the locking member 6 so as to drive the connecting portion 62 to rotate. The connecting portion 62 in rotation presses the torsion spring 73 and drives the locking portion 63 to rotate at the same time, such that the locking portion 63 is switched from the locked state to the unlocked state. When the operating portion 71 is no longer pressed, the pressed torsion spring 73 automatically resets, thereby driving the rotating portion 61 to reset, so that the locking portion 63 is automatically reset from the unlocked state to the locked state.

To be specific, based on the torsion spring 73, the locking portion 63 can be automatically reset from the unlocked state to the locked state, after the locking portion 63 is plugged into the accommodating cavity 012 of the rail 01 via the opening 011 of the rail 01, and after the locking portion 63 is pulled out from the accommodating cavity 012 of the rail 01 via the opening 011 of the rail 01.

When the unlocking member 7 includes the torsion spring 73, based on the fact that the locking member 6 can be automatically reset, a connection mode between the connecting portion 62 of the locking member 6 and the unlocking member 7 may be a contact connection mode. In this way, after the locking portion 63 is pressed by the inner wall of the opening 011 of the rail 01 to automatically rotate to the unlocked state, the locking portion 63, based on the presence of the torsion spring 73, can be automatically reset from the unlocked state to the locked state, without the need to operate the operating portion 71 to reset the locking portion 63 to the locked state.

Figure 19:
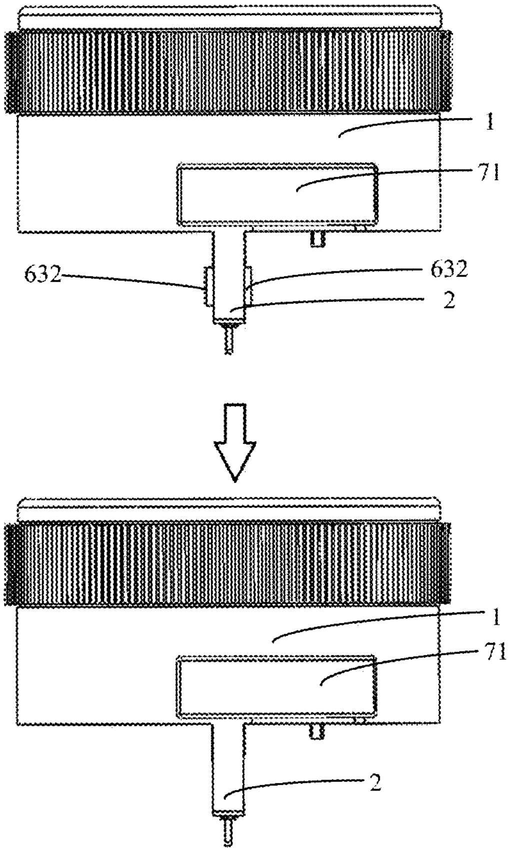
FIG. 19 is a schematic diagram of a process during which an adapter unlocked by toggling according to an embodiment of the present disclosure is switched from a locked state to an unlocked state.

As another example, as shown in FIG. 19 and FIG. 20, the operating portion 71 is a toggle sheet. For example, as shown in FIG. 20, the operating portion 71 of the toggle sheet structure includes a toggle section 715 and a second connecting section 716. The toggle section 715 is of an arc-shaped sheet structure. A first end of the second connecting section 716 is connected to the inner sidewall of the toggle section 715, and a second end of the second connecting section 716 is connected to the transmission portion 72.

In the embodiment of the present disclosure, the arc-shaped sheet-like toggle section 715 has a radian adapted to a radian of the circular sidewall of the socket body 1, and is operated by toggling clockwise or counterclockwise in a circumferential direction. The sidewall of a housing of the socket body 1 is provided with a corresponding arc-shaped elongated hole to provide a space for the operating portion 71 to move. The toggle section 715 is attached to the sidewall of a housing of the adapter.

A rough structure, such as a geometric grain, is provided on the outer sidewall of the arc-shaped sheet-like toggle section 715 to increase the friction with fingers, such that that the toggling operation is more labor-saving.

The second connecting section 716 is block-shaped. For example, a first end of the second connecting section 716 and the inner wall of the toggle section 715 are connected in an integrally formed manner to improve the connection strength; and a second end of the second connecting section 716 is in clamping connection to the transmission portion 72 for ease of assembly.

For example, the top surface of the second connecting section 716 is provided with a clamping slot, and the first end of the transmission portion 72 extends into the clamping slot and thus is in clamping connection to the second connecting section 716. Further, the bottom surface of the second connecting section 716 is provided with an arc-shaped groove, an arc direction of the arc-shaped groove is consistent with a toggling direction of the toggle section 715. Correspondingly, the sidewall of the socket body 1 is provided with an arc-shaped guiding block. In this way, when the arc-shaped guiding block is disposed in the arc-shaped groove and the toggle section 715 is toggled, the operating portion 71 will stably move along the toggling trajectory.

When the operating portion 71 is a toggle sheet, the transmission portion 72 is such configured that when the button is toggled, the transmission portion 72 can transfer a toggling force of the toggle sheet to the locking portion 63, and thus the locking portion 63 is rotated.

For example, the transmission portion 72 is of a rod-shaped structure. A first end of the transmission portion 72 is in clamping connection to the second connecting section 716 of the operating portion 71, and a second end of the transmission portion 72 is fixedly connected to the sidewall of the connecting portion 62.

In addition, the operating portion 71 of the toggle sheet structure may also be used in combination with the torsion spring 73. For details, please refer to the related content of the torsion spring as mentioned above.

Figure 21:
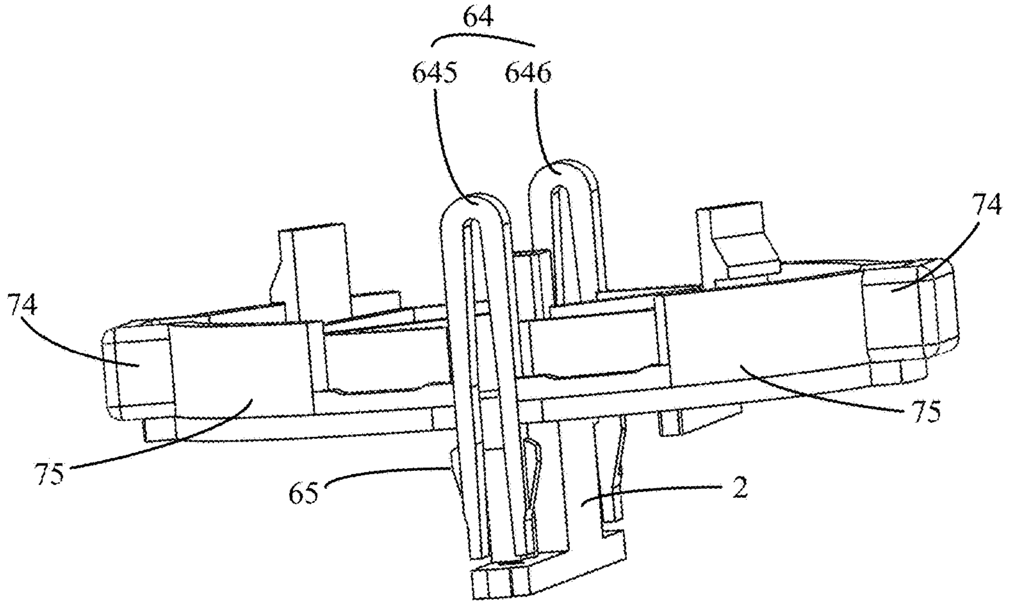
FIG. 21 is a schematic diagram of a partial structure of an adapter according to an embodiment of the present disclosure.
Figure 22:
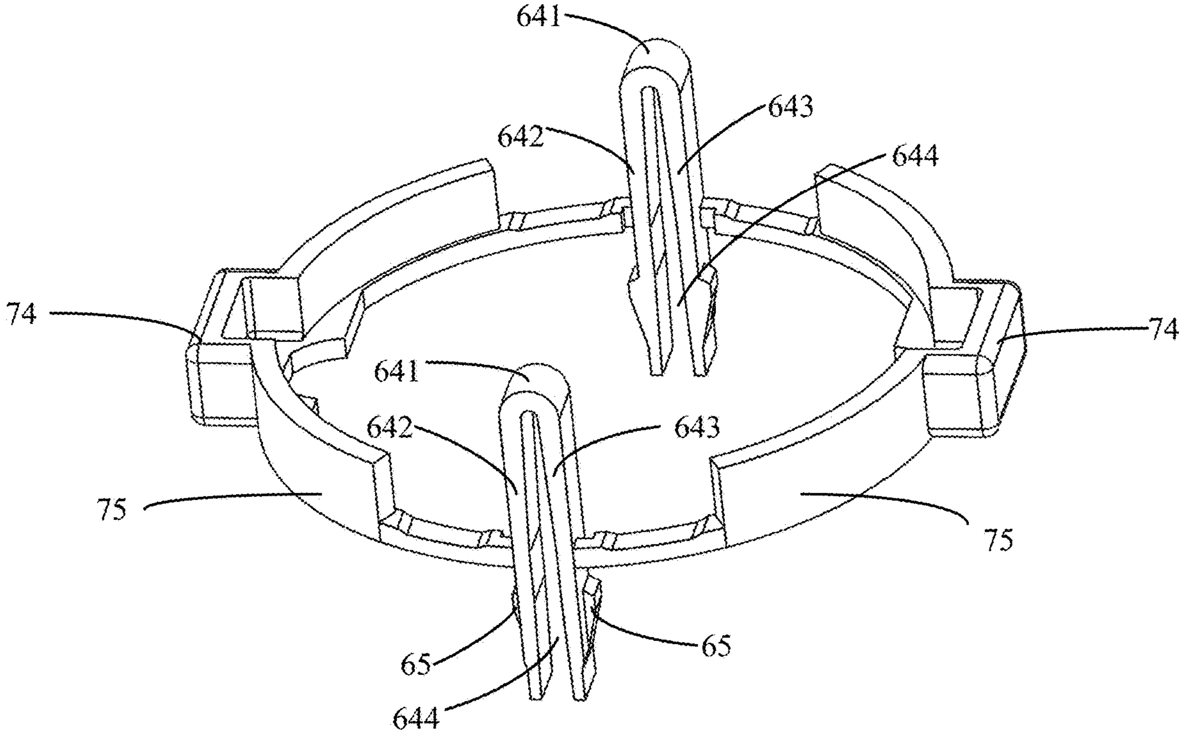
FIG. 22 is a schematic diagram of a partial structure of an adapter according to an embodiment of the present disclosure.
Figure 23:
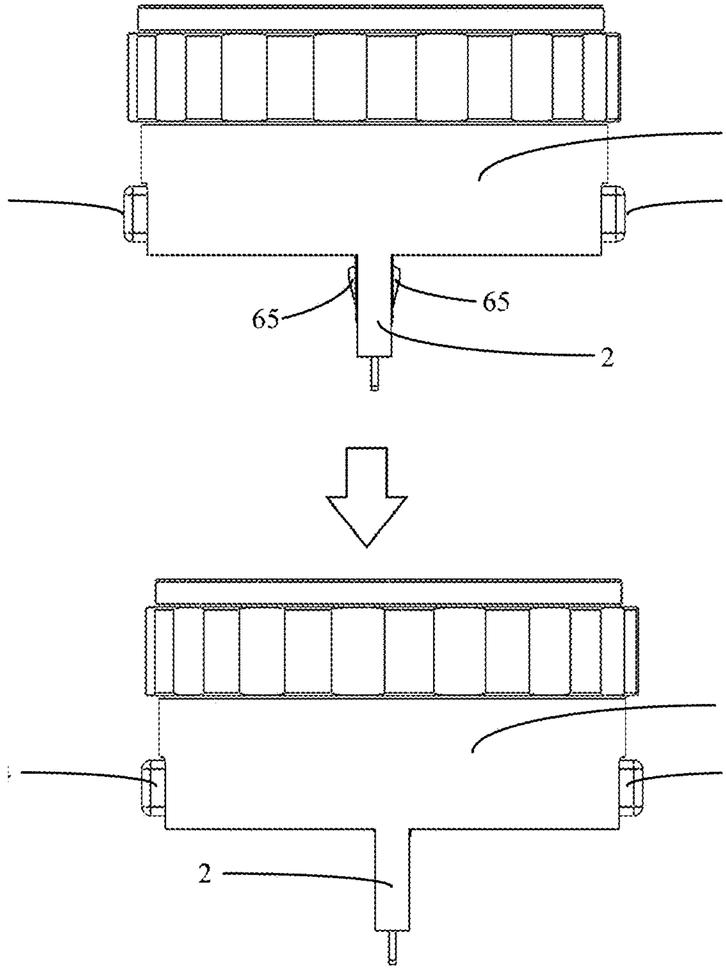
FIG. 23 is a schematic diagram of a process during which an adapter according to an embodiment of the present disclosure is switched from a locked state to an unlocked state.

An embodiment of the present disclosure also provides a locking member 6 that can be switched between a locked state and an unlocked state by means of an extending and retracting movement. As shown in FIG. 21 and FIG. 22, the locking member 6 includes a deforming portion 64 and a second locking portion 65. The deforming portion 64 runs through one side of the socket body 1 facing away from the jacks. The second locking portion 65 is connected to one end of the deforming portion 64 disposed below the socket body 1. The deforming portion 64 can be elastically deformed under the action of the unlocking member 7, such that the second locking portion 65 can be switched between the locked state and the unlocked state by means of the extending and retracting movement.

The deforming portion 64 can be elastically deformed under the action of the unlocking member 7 to drive the second locking portion 65 to make an extending and retracting movement (when extending, the second locking portion 65 is in the locked state; and when being retracted, the second locking portion 65 is in the unlocked state), thereby achieving the purpose of switching the second locking portion 65 between the locked state and the unlocked state.

In a possible implementation, the structure of the deforming portion 64 is shown in FIG. 22. The deforming portion 64 includes a top plate 641, a first side plate 642 and a second side plate 643. The first side plate 642 and the second side plate 643 are respectively connected to two opposite ends of the top plate 641, and a gap 644 is formed between the first side plate 642 and the second side plate 643. The second locking portion 65 is respectively connected to a first surface of the first side plate 642 and a second surface of the second side plate 643. The first surface is a surface of the first side plate 642 facing away from the gap 644; and the second surface is a surface of the second side plate 643 facing away from the gap 644.

The top plate 641 may be either in an arc plate shape or in a flat plate shape. The arc plate shape is particularly selected, such that the deforming portion 64 is more conducive to elastic deformation. The first side plate 642 and the second side plate 643 are elongated rectangular plates to simplify the structure. In the presence of the top plate 641, the gap 644 is formed between the first side plate 642 and the second side plate 643 to endow the deforming portion 64 with the elasticity.

In the extending state (that is, in the initial state), the presence of the gap 644 makes the two second locking portions 65 in the locked state. In the compressed state, the length of the gap 644 is reduced, so that the two second locking portions 65 are also compressed accordingly, and then switched to the unlocked state.

In another possible implementation, the deforming portion 64 includes two supporting side plates with opposite gaps, and an elastic member, such as a compression spring, disposed between the two supporting side plates. One second locking portion 65 (the relevant drawing is not shown) is connected to the surface of each supporting side plate away from the gap. For such implementation, the deforming portion 64 is endowed with the elasticity by connecting the elastic member between the two supporting side plates.

In the embodiment of the present disclosure, the structure of the second locking portion 65 may refer to the above description of the locking portion 63, which is not be repeated here.

In a possible implementation, as shown in FIG. 22, the unlocking member 7 includes a second operating portion 74 and a second transmission portion 75. The second transmission portion 75 is arc-shaped, disposed on the inner side of the socket body 1 (see FIG. 21), and connected to the outer surface of the second transmission portion 75.

Two unlocking members 7 are provided. In addition, the deforming portion 64 includes a first deforming portion 645 and a second deforming portion 646. Two ends of the second transmission portion 75 of one unlocking member 7 are respectively connected to a first surface of the first deforming portion 645 and a first surface of the second deforming portion 646; and two ends of the second transmission portion 75 of the other unlocking member 7 are respectively connected to a second surface of the first deforming portion 645 and a second surface of the second deforming portion 646.

The structures of the first deforming portion 645 and the second deforming portion 646 may refer to the above description of the structure of the deforming portion 64. That is, each of the first deforming portion 645 and the second deforming portion 646 includes a top plate 641, a first side plate 642, and a second side plate 643. The first side plate 642 and the second side plate 643 are respectively connected to two opposite ends of the top plate 641, and a gap 644 is formed between the first side plate 642 and the second side plate 643.

Two ends of the second transmission portion 75 of one unlocking member 7 are respectively connected to a first surface of the first side plate 642 of the first deforming portion 645 and a first surface of the first side plate 642 of the second deforming portion 646; and two ends of the second transmission portion 75 of the other unlocking member 7 are respectively connected to a second surface of the second side plate 643 of the first deforming portion 645 and a second surface of the second side plate 643 of the second deforming portion 646.

In application, a distance between the two second transmission portions 75 can be reduced by pressing the two second operating portions 74 at the same time. The second transmission portion 75 transfers this pressing force to the first deforming portion 645 and the second deforming portion 646 of the unlocking member 7, such that a length of the gap 644 between the first deforming portion 645 and the second deforming portion 646 is reduced, and thereby the two second locking portions 65 connected to the first deforming portion 645 and the two second locking portions 65 connected to the second deforming portion 646 are compressed accordingly, and then an unlocked state is switched (see the unlocking process shown in FIG. 14). When the second operating portion 74 is no longer pressed, the deforming portion 64 automatically resets based on its elasticity and returns to the locked state.

Next, the process of plugging the adapter will be described, in combination with FIG. 14, based on the above-mentioned structures of the locking member 6 and the unlocking member 7, and taking the unlocking member 7 being a button as an example.

Referring to step A in FIG. 14, prior to plugging the adapter into the rail 01, the adapter is aligned with the opening 011 of the rail 01.

Referring to step B in FIG. 14, when the adapter is plugged into the rail 01, that is, when the locking portion 63 enters the opening 011 of the rail 01 from the outside, the guiding surface 6321 is in contact with the inner wall of the opening 011, thereby driving the locking portion 63 to rotate. When the locking portion 63 is rotated to a certain angle, for example, 90°, the locking portion 63 is completely stored. At this time, there is no any obstacle between the opening 011 of the rail 01 and the guiding body 2, and the adapter can be smoothly plugged into the accommodating cavity 012 of the rail 01.

Referring to step C in FIG. 14, when the adapter is completely plugged into the accommodating cavity 012 of the rail 01, there is no interaction force between the opening 011 of the rail 01 and the locking portion 63, and the locking portion 63 is restored to the initial locked state under the action of the torsion spring 73. At this time, the locking block 632 of the locking portion 63 is misaligned with the opening 011 of the rail 01, such that the adapter cannot fall off from the rail in the case of a general external force.

In a possible implementation, when the adapter is pulled out from the rail 01, that is, when the locking portion 63 enters the opening 011 of the rail 01 from the accommodating cavity 012, the operating portion 71 is pressed to finally drive the locking portion 63 to rotate. When the locking portion 63 is rotated to a certain angle, for example, 90°, the locking portion 63 is completely stored. At this time, there is no any obstacle between the opening 011 of the rail 01 and the guiding body 2, such that the adapter can be smoothly pulled out from the opening 011 of the rail 01.

Figure 24:
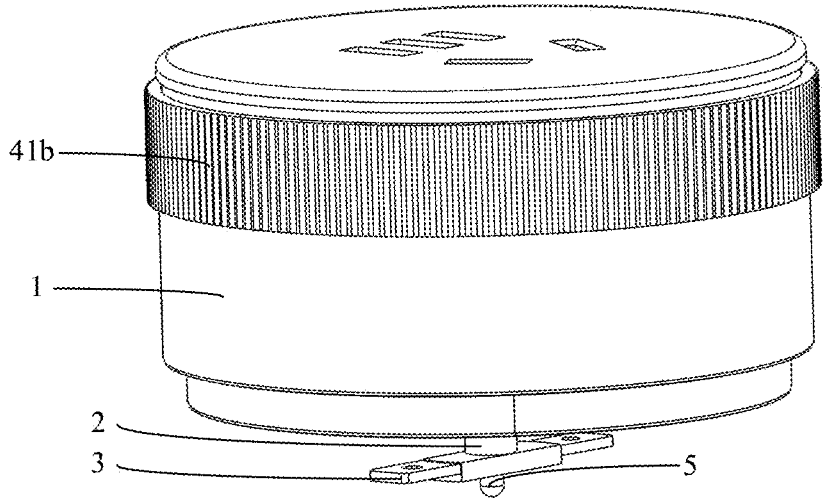
FIG. 24 is a schematic diagram of an adapter according to an embodiment of the present disclosure.
Figure 25:
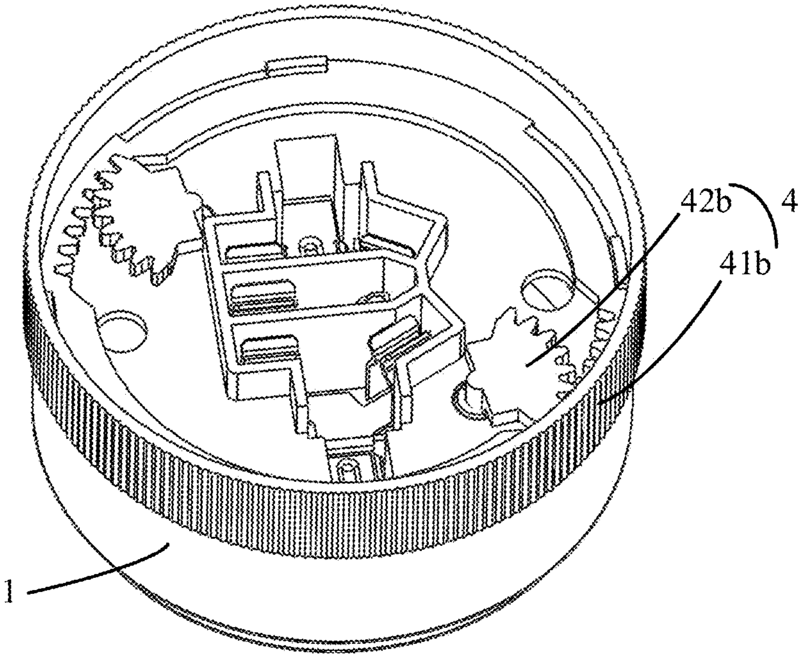
FIG. 25 is a schematic diagram of an internal structure of an adapter according to an embodiment of the present disclosure.

(2) As shown in FIG. 24 and FIG. 25, the guiding body 2 is rotatably connected to the socket body 1, and connected to the control member 4 in a transmission fashion. The movable conducting strip 3 is fixedly connected to the guiding body 2, and the control member 4 can drive the movable conducting strip 3 to rotate by driving the guiding body 2. For example, the guiding body 2 is cylindrical and has an outer diameter matching with the size of the opening of the rail so as to play a guiding role.

A possible implementation of the control member 4 is provided below.

Figure 26:
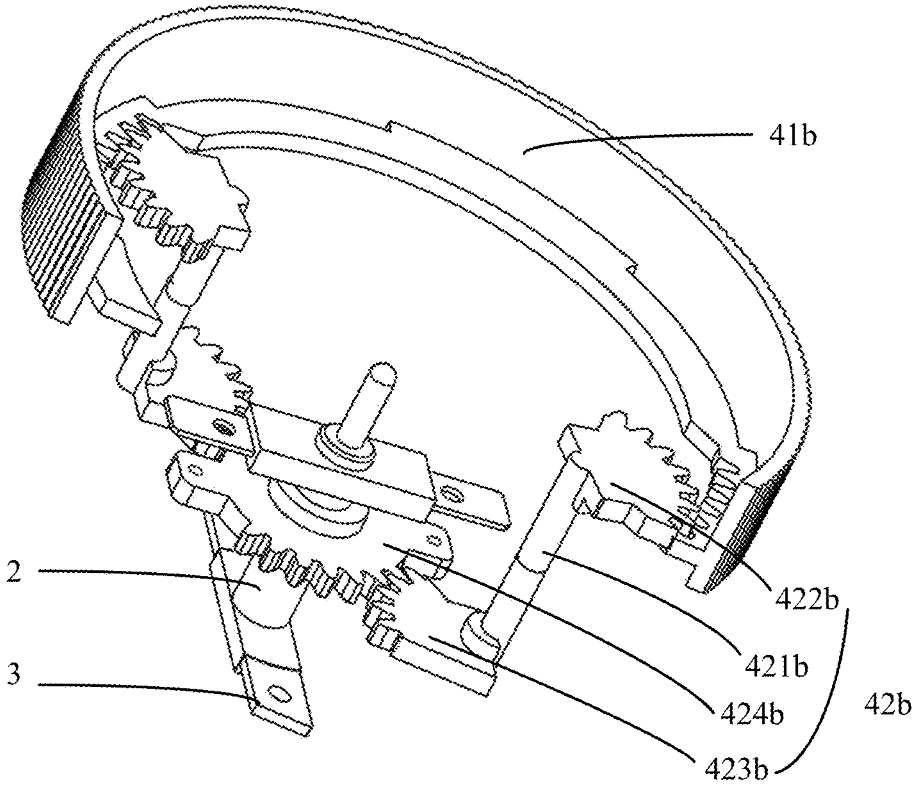
FIG. 26 is a schematic diagram of a control member according to an embodiment of the present disclosure.

As shown in FIG. 25 and FIG. 26, the control member 4 includes a second rotating ring 41*b* and a second transmission assembly 42*b*. The second rotating ring 41*b* is rotatably connected to the socket body 1. One end of the second transmission assembly 42*b* is connected to an inner wall of the second rotating ring 41*b* in a transmission fashion, and the other end of the first transmission assembly 42*b* is connected (e.g., fixedly connected) to the guiding body 2 in a transmission fashion.

When the second rotating ring 41*b* is rotated, the rotation of the second rotating ring 41*b* is transferred to the guiding body 2 through the second transmission assembly 42*b*, and then to the movable conducting strip 3, so that the movable conducting strip 3 can be rotated relative to the socket body 1.

When the adapter needs to be powered normally, the adapter is installed on the rail, and the movable conducting strip 3 is at a power-taking position and is in contact with a rail conducting member in the rail. When the adapter needs to be slid, the second rotating ring 41*b* is rotated, and the movable conducting strip 3 is driven by the second transmission assembly 42*b* to rotate to a power-off position. At this time, the movable conducting strip 3 is detached from a rail plug bush in the rail, and then the adapter can be slid normally in the rail in an uncharged fashion.

When the adapter is slid to a target position, the second rotating ring 41*b* can be rotated in a direction opposite to the previous direction, such that the movable conducting strip 3 is driven to rotate to a power-taking position and is in contact with the rail plug bush in the rail. Therefore, the adapter is quickly fixed in the target position. In this case, the adapter is in the power-taking state and can normally supply power to an electrical appliance.

A possible implementation of the second transmission assembly 42*b* is provided below.

As shown in FIG. 26, the second transmission assembly 42*b* includes a transmission shaft 421*b*, a driving gear 422*b*, a driven gear 423*b* and a sun gear 424*b*. The driving gear 422*b* and the driven gear 423*b* are fixedly connected to two ends of the transmission shaft 421*b*, respectively. The driving gear 422*b* is engaged with an inner wall of the second rotating ring 41*b*, and the driven gear 423*b* is engaged with the sun gear 424*b*. The sun gear 424*b* is fixedly connected to the guiding body 2, and is coaxial with the guiding body 2.

Next, a transmission principle that the second rotating ring 41*b* controls the movable conducting strip 3 to rotate will be described.

Figure 27:
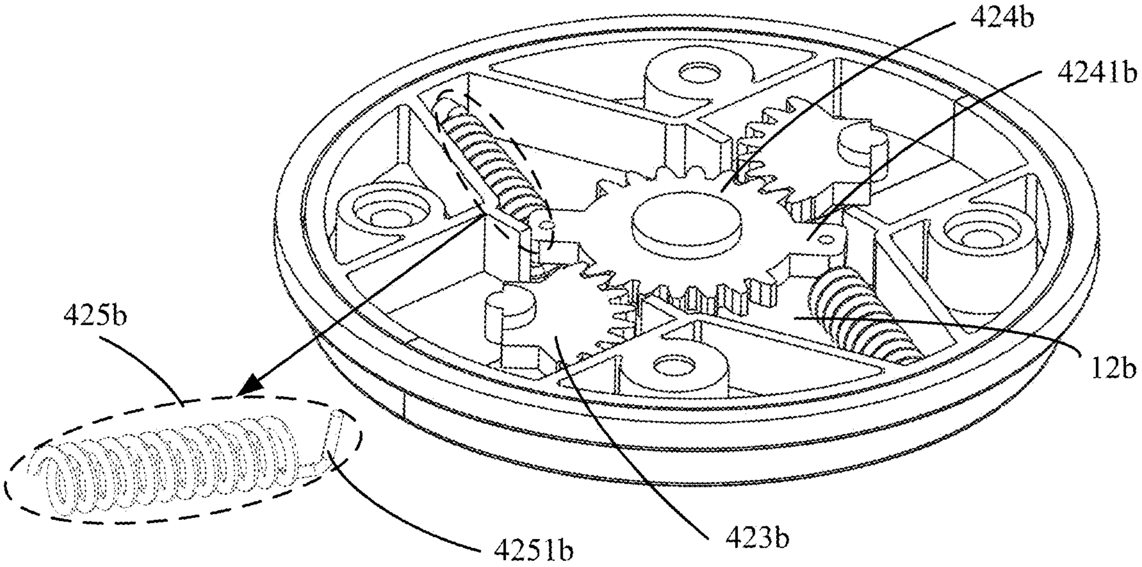
FIG. 27 is a schematic diagram of a second transmission assembly according to an embodiment of the present disclosure.

As shown in FIG. 27, the second rotating ring 41*b* is rotated by the user. Since an internal gear structure of the inner wall of the second rotating ring 41*b* is engaged with the driving gear 422*b*, the second rotating ring 41*b* drives the driving gear 422*b* to rotate. Since the driving gear 422*b* and the driven gear 423*b* are both fixed on the transmission shaft 421*b*, the driving gear 422*b* drives the driven gear 423*b* to rotate through the transmission shaft 421*b*. Since the driven gear 423*b* is engaged with the sun gear 424*b*, the driven gear 423*b* drives the sun gear 424*b* to rotate, the sun gear 424*b* then drives the guiding body 2 to rotate, and the guiding body 2 drives the movable conducting sheet 3 to rotate. By rotating the second rotating ring 41*b* in two directions, the movable conducting strip 3 can be rotated in two directions, so that the movable conducting strip 3 can be switched between the power-off position and the power-taking position.

In a possible implementation, the number of the transmission shafts 421*b*, the driving gears 422*b* and the driven gears 423*b* may be 2, respectively. The two driving gears 422*b* are both engaged with the inner wall of the second rotating ring 41*b*, and the two driven gears 423*b* are both engaged with the sun gear 424*b*, so that the rotation is transferred more smoothly.

In a possible implementation, the driving gear 422*b* and the driven gear 423*b* may be incomplete gears, thereby reducing the occupation to an internal space of the socket body 1.

In order to limit a rotation range of the movable conducting strip 3, as shown in FIG. 27, the socket body 1 has a second limiting groove 12*b* inside. When the movable conducting strip 3 rotates to the power-taking position, the sun gear 424*b* is limited to one groove wall of the second limiting groove 12*b*; and when the movable conducting strip 3 rotates to the power-off position, the sun gear 424*b* is limited to the other groove wall of the second limiting groove 12*b*.

In a possible implementation, under the limiting of the second limiting groove 12*b*, the movable conducting strip 3 can complete a rotation in a range of 90°. Two limit positions limited by the second limiting groove 12*b* correspond to the power-off position and the power-taking position of the movable conducting strip 3, respectively. In addition, in order for the user to understand the power-off position and the power-taking position of the movable conducting strip 3, corresponding signs may be provided on the outer wall of the socket body 1.

Figure 28:
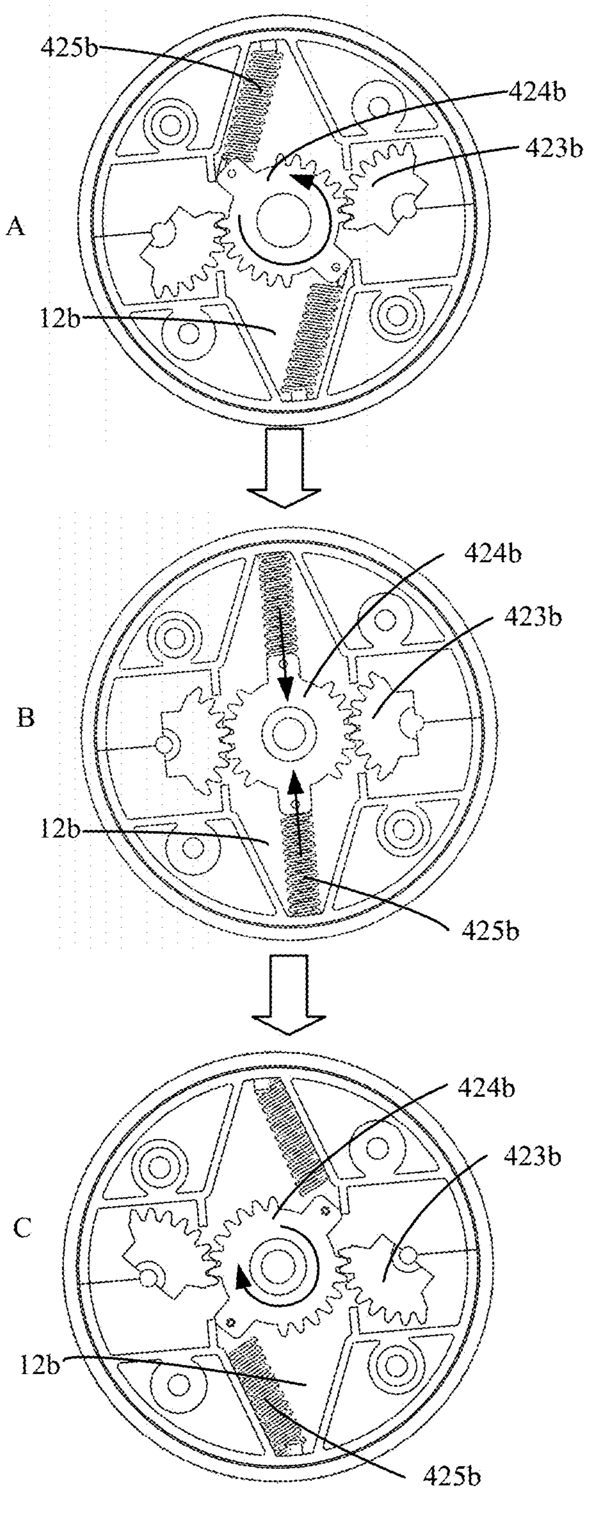
FIG. 28 is a schematic diagram of a second swing spring at a limit position and a dead center position according to an embodiment of the present disclosure.

In order to maintain the movable conducting strip 3 stable at the power-off position and the power-taking position, as shown in FIG. 27 and FIG. 28, the second transmission assembly 42*b* further includes a swing spring 425*b*, which is perpendicular to the guiding body 2. A fixed end of the swing spring 425*b* is connected to a bottom of the second limiting groove 12*b*, a movable end of the swing spring 425*b* is connected to the sun gear 424*b*, and the swing spring 425*b* is in a compressed state. The second limiting groove 12*b* has a flared opening. The swing spring 425*b* can swing in a space defined by the second limiting groove 12*b*, and can drive the sun gear 424*b* to rotate toward the groove wall of the second limiting groove 12*b*.

As shown in FIG. 27, the sun gear 424*b* has a spring connecting portion 4241*b* which is provided with a through hole. A movable end of the swing spring 425*b* is provided with a connecting post 4251*b*. The connecting post 4251*b* is plugged into the through hole in the spring connecting portion 4241, so that the swing spring 425*b* is hinged with the sun gear 424*b*. In this way, during the rotation of the swing spring 425*b* following the sun gear 424*b*, the connecting post 4251*b* will rotate relative to the through hole, so that the swing spring 425*b* can swing more smoothly. A limiting post is disposed at the bottom of the second limiting groove 12*b*, and a fixed end of the swing spring 425*b* sleeves the limiting post. In addition, the number of the swing springs 425*b* may be 2. The two swing springs 425*b* may be symmetrically arranged inside the socket body 1. Correspondingly, the sun gear 424*b* may be symmetrically provided with two spring connecting portions 4241*b*, which are respectively connected to the two swing springs 425*b*.

As shown in a state A in FIG. 28, a schematic diagram of the sun gear 424*b* contacting one groove wall of the second limiting groove 12*b* is shown, and this position may be regarded as the power-off position of the movable conducting strip 3.

As shown in a state B in FIG. 28, a schematic diagram of a position where an axis of the swing spring 425*b* intersects the axis of the guiding body 2 is shown, and this position may be regarded as a dead center position or a critical position of the movable conducting strip 3.

As shown in a state C in FIG. 28, a schematic diagram of the sun gear 424*b* contacting the other groove wall of the second limiting groove 12*b* is shown, and this position may be regarded as the power-taking position of the movable conducting strip 34.

Next, in conjunction with FIG. 28, a working state of the sun gear 424*b* and the swing spring 425*b* during the rotation process of the movable conducting strip 3 from the power-off position to the power-taking position will be described.

As shown in the state A in FIG. 28, since the swing spring 425*b* is in a compressed state, it will apply a pushing force to the sun gear 424*b*. This pushing force causes the sun gear 424*b* to have a tendency to rotate in a direction indicated by an arrow in FIG. 29. Thus, the swing spring 425*b* presses the sun gear 424*b* against the groove wall of the second limiting groove 12*b*, and the movable conducting strip 3 maintains a stable state at the power-off position.

The user rotates the second rotating ring 41*b*, such that the movable conducting strip 3 moves toward the power-taking position. In this process, the sun gear 424*b* needs to overcome the pushing force of the swing spring 425*b*. It may be understood that, when the sun gear 424*b* has not moved to the dead center position shown in the state B in FIG. 28, the sun gear 424*b* always has a tendency to rotate in a direction indicated by an arrow in the state A in FIG. 28 under the pushing force of the swing spring 425*b*. Therefore, if the user no longer applies an acting force to the second rotating ring 41*b* between the power-off position and the dead center position, the movable conducting strip 3 will always return to its power-off position automatically under the pushing force of the swing spring 425*b*.

The user continues to rotate the second rotating ring 41*b*, such that the sun gear 424*b* moves to the dead center position shown in the state B in FIG. 28. At the dead center position, since the axis of the sun gear 424*b* coincides with the axis of the swing spring 425*b*, the sun gear 424*b* no longer has a tendency to rotate, with its force direction being shown in a direction indicated by an arrow shown in the state B in FIG. 28. If the user no longer applies an acting force to the second rotating ring 41*b* just at the dead center position, the movable conducting strip 3 will be stabilized at the dead center position.

If the user continues to rotate the second rotating ring 41*b*, the sun gear 424*b* will pass the dead center position. Under the pushing force of the swing spring 425*b*, the sun gear 424*b* has a tendency to rotate in a direction indicated by an arrow shown in the state C in FIG. 28. Therefore, if the user no longer applies an acting force to the second rotating ring 41*b* between the power-taking position and the dead center position, a conducting strip assembly 4 will always return to its power-taking position automatically under the pushing force of the swing spring 425*b*.

It may be seen from the above description that the movable conducting strip (or the sun gear 424*b*) theoretically has three stable positions totally, which are the power-off position, the power-taking position, and the dead center position. The dead center position is disposed between the power-off position and the power-taking position. In the case of no external force, the movable conducting strip 3 will automatically return to and is stabilized at the power-off position when it is at any position between the dead center position and the power-off position, and will automatically return to and is stabilized at the power-taking position when it is at any position between the dead center position and the power-taking position.

In addition, due to the characteristic of automatic return of the movable conducting strip 3, the second rotating ring 41*b* does not need to complete the entire movement of driving the movable conducting strip 3 from the power-off position to the power-taking position. The second rotating ring 41*b* only needs to be able to drive the movable conducting strip 3 to move to pass the dead center position from the power-off position, and to pass the dead center position from the power-taking position. In addition, by means of the design of the movable conducting strip 3 to automatically return to its position, the user's operating feel is enhanced, and the movable conducting strip 3 can rotate to the power-taking position or the power-off position quickly.

Figure 29:
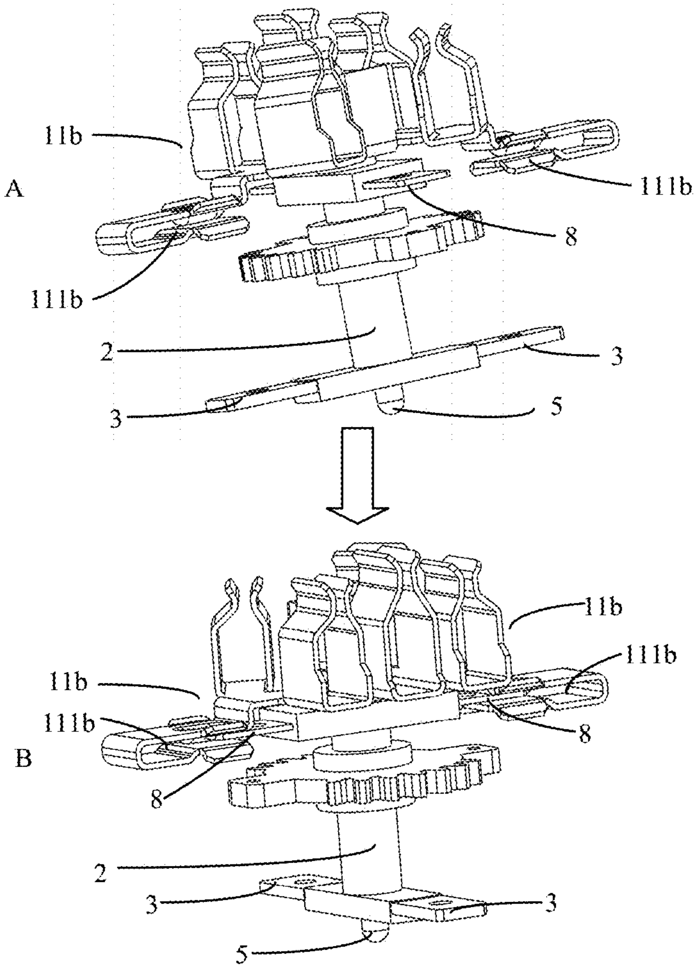
FIG. 29 is a schematic diagram of a docking principle of an internal conducting strip and an internal plug bush according to an embodiment of the present disclosure.

Since the second plug bush 11*b* is fixed inside the socket body 1 and the movable conducting strip 3 is rotatable relative to the socket body 1, the movable conducting strip 3 is rotatable relative to the second plug bush 11*b*. In order to make the movable conducting strip 3 to be always electrically connected to the second plug bush 11*b*, when it rotates to the power-taking position, the adapter further includes an internal conducting strip 8, which is disposed inside the socket body 1, as shown in FIG. 29. The internal conducting strip 8 is fixedly connected to the guiding body 2, and electrically connected to the movable conducting strip 3. An internal plug bush 111*b* is disposed at an internal end of the second plug bush 11*b*. A position and shape of the internal plug bush 111*b* match with those of the internal conducting strip 8, such that the internal conducting strip 8 can be plugged into and pulled out from the internal plug bush 111*b* during the rotation of the movable conducting strip 3.

As shown in the state A in FIG. 29, the internal conducting strip 8 is detached from the internal plug bush 111*b*. In this case, the movable conducting strip 3 is in the power-off position.

As shown in the state B in FIG. 29, the internal conducting strip 8 is plugged into the internal plug bush 111*b*, and the second plug bush **11*b* is electrically connected to the movable conducting strip 3 through the internal conducting strip 8. At this time, the movable conducting strip 3 may be in the power-taking position. Therefore, the movable conducting strip 3 may take power from the rail and supply the power to the second plug bush 11*b***.

The internal conducting strip 8 and the movable conducting strip 3 may be an integral copper strip.

In addition, in addition to the above solution of arranging the internal plug bush **111*b* and the internal conducting strip 8, the movable conducting strip 3 may also be connected to the corresponding second plug bush 11*b* through a flexible connecting line. In this case, the second plug bush 11*b* is always electrically connected to the movable conducting strip 3. During the rotation of the movable conducting strip 3, the flexibility of the flexible connecting line prevents the electrical connection between the second plug bush 11*b* and the movable conducting strip 3** from being disconnected.

Figure 30:
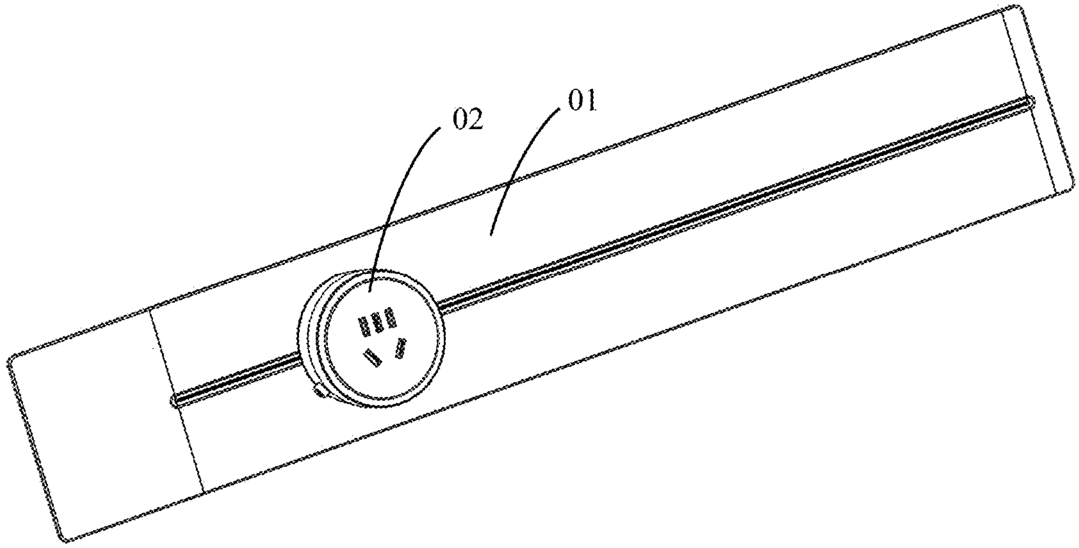
FIG. 30 is a schematic diagram of a rail socket according to an embodiment of the present disclosure.

An embodiment of the present disclosure further provides a rail socket. As shown in FIG. 30, the rail socket includes a rail 01, and the adapter 02 according to any of the above aspects.

The specific structure of the rail 01 is different based on the difference in the adapter 02 docked therewith. Next, the structure of the rail 01 and the use process of the adapter 02 will be described by taking the rail 01 docked with the adapter 02 shown in FIGS. 1-13 as an example.

As shown in FIG. 14, an opening 011 and an accommodating cavity 012 which extend in a length direction of the rail 01 are respectively formed in the top of and inside the rail 01. Soft protective strips 013, for example, made of silica gel, are arranged on both sides of the top wall of the opening 011. The soft protective strips 013 extend in the length direction of the opening 011. The soft protective strips 013 are configured to prevent impurities from falling into the accommodating cavity 012 and play a role of protecting components inside the accommodating cavity 012. Because the soft protective strips 013 are soft, the plugging and pulling operations of the adapter are not affected.

When the user uses the adapter improperly or the adapter suffers a severe external force, the adapter may forcibly fall off from the energized guide rail. However, because of the presence of the soft protective strips 013, it plays a role of protecting the adapter 02 so that the adapter 02 is not damaged in the forced fall-off process and the locking member cannot be damaged as well.

Figure 31:
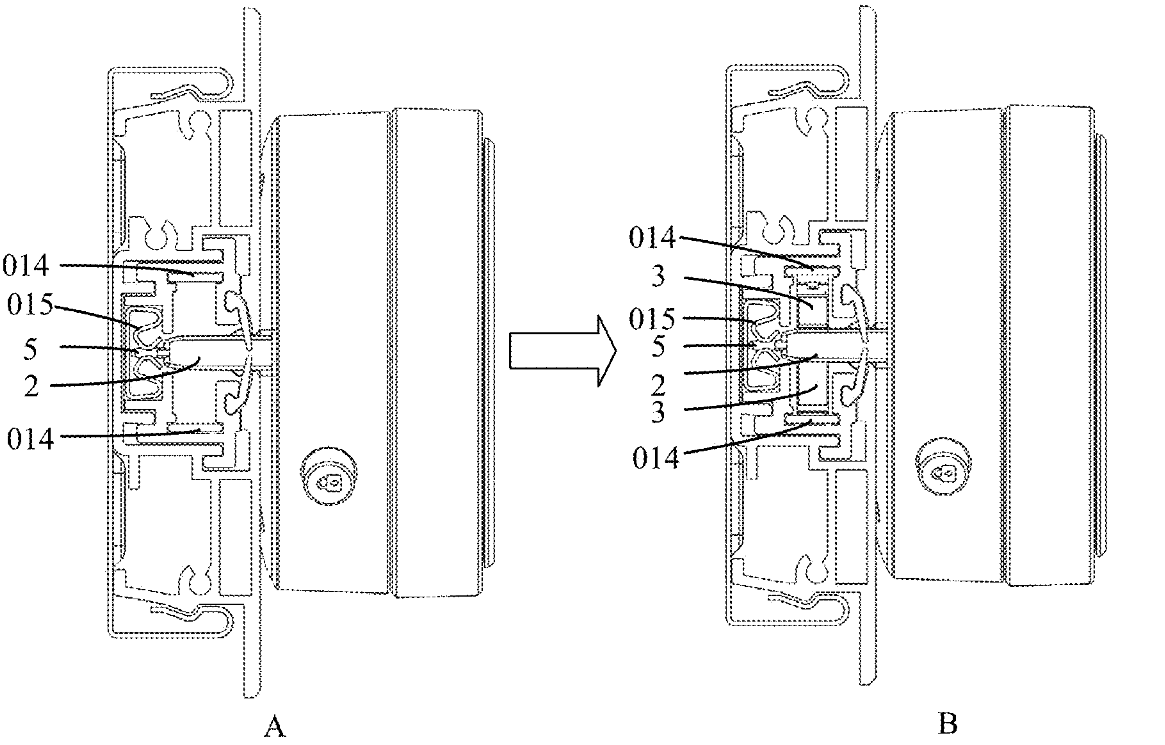
FIG. 31 is a schematic diagram of a rail socket when an adapter is in a power-off state and a power-taking state according to an embodiment of the present disclosure.

As shown in FIG. 31, a conducting member inside the accommodating cavity 012 includes two rail conducting strips 014 and an E-pole rail plug bush 015. The two rail conducting strips 014 are an L-pole rail conducting strip and an N-pole rail conducting strip, respectively, which face each other and are parallel to a plugging direction of a rail groove.

Next, the use process of the adapter 02 will be described.

When the rail socket is configured to supply power, firstly, the movable conducting strip 3 of the adapter 02 is controlled to be in the stored state; then, the guiding body 2 of the adapter 02 is plugged into the accommodating cavity 012; and next, the first rotating ring **41*a* is rotated, such that the movable conducting strip 3 is extended and is in contact with the corresponding rail conducting strip 014, and the adapter 02** is in a power-taking state.

When the adapter 02 needs to be slid, the first rotating ring **41*a* is rotated, such that the movable conducting strip 3 is stored and detached from the rail conducting strip 014, and the adapter 02 is in a power-off state. Then, the adapter 02** may be slid in an uncharged fashion.

As shown in the state A in FIG. 31, the movable conducting strip 3 of the adapter 02 is in the stored state, and the movable conducting 3 is not in contact with the rail conducting strip 014 in the rail 01, such that the adapter 02 is in the power-off state.

As shown in the state B in FIG. 31, the movable conducting sheet 3 of the adapter 02 is in an extended state and is in contact with and electrically connected to the rail conducting strip 014 in the rail 01. Therefore, the movable conducting strip 3 can take power from the corresponding rail conducting strip 014, and the adapter 02 is in a power-taking state.

In addition, in the above two cases, the E-pole conducting member 5 is in contact with the E-pole rail plug bush 015 in the rail 01.

The foregoing descriptions are merely optional embodiments of the present disclosure, and are not intended to limit the present disclosure. Within the spirit and principles of the present disclosure, any modifications, equivalent substitutions, improvements, etc., shall fall within the protection scope of the present disclosure.

What is claimed is:

1. An adapter, comprising a socket body, a guiding body, a movable conducting strip and a control member; wherein the guiding body and the movable conducting strip are both disposed on one side of the socket body facing away from jacks; and the control member is connected to the movable conducting strip in a transmission fashion, and configured to drive the movable conducting strip to rotate relative to the socket body; and wherein the guiding body is fixedly connected to the socket body; and the movable conducting strip is driven by the control member to be extended and stored relative to the guiding body;

wherein the control member comprises a first rotating ring and a first transmission assembly;

the first rotating ring is rotatably connected to the socket body; and one end of the first transmission assembly is connected to an inner wall of the first rotating ring in a transmission fashion, and an other end of the first transmission assembly is connected to the movable conducting strip in a transmission fashion; and wherein the first transmission assembly comprises a toggle rod and a transmission rod;

the toggle rod is matched with the inner wall of the first rotating ring; and the transmission rod is perpendicular to the toggle rod, one end of the transmission rod is fixedly connected to a mounting portion of the toggle rod, the other end of the transmission rod is fixedly connected to the movable conducting strip, and the mounting portion is disposed between two ends of the toggle rod.

2. The adapter according to claim 1, wherein the inner wall of the first rotating ring has a driving structure, which comprises two protrusions in a circumferential direction; and the mounting portion is disposed between the two protrusions, and the two protrusions drives the toggle rod to rotate respectively by toggling the mounting portion.

3. The adapter according to claim 1, wherein the first transmission assembly further comprises a first driving rod and a first swing spring, wherein the first driving rod is disposed between the toggle rod and the movable conducting strip, and is perpendicular to the transmission rod, one end of the first driving rod is fixedly connected to the transmission rod, and the other end of the first driving rod abuts against a movable end of the first swing spring;

a fixed end of the first swing spring abuts against an inner wall of the socket body, and the first swing spring is in a compressed state; and the first driving rod has a dead center position and two limit positions, the two limit positions respectively correspond to a stored state and an extended state of the movable conducting strip, and the dead center position is disposed between the two limit positions; and at the dead center position, an axis of the first driving rod coincides with an axis of the first swing spring.

4. The adapter according to claim 1, wherein the movable conducting strip comprises an N-pole conducting strip and an L-pole conducting strip;

the adapter includes two of the first transmission assemblies, and two transmission rods of the two first transmission assemblies are connected to the N-pole conducting strip and the L-pole conducting strip in a transmission fashion, respectively; and an E-pole conducting member of the adapter protrudes from the guiding body in a direction away from the socket body.

5. The adapter according to claim 4, wherein a first N-pole plug bush and a first L-pole plug bush in the socket body are configured to sleeve the corresponding transmission rods, and are electrically connected to the corresponding transmission rods; and a first E-pole plug bush in the socket body sleeves the E-pole conducting member.

6. The adapter according to claim 1, wherein the adapter further comprises a locking member and an unlocking member;

the locking member runs through one side of the socket body facing away from the jacks and is configured to be limited inside a rail in a locked state and to be released from the rail in an unlocked state; and the unlocking member is connected to the socket body and is configured to enable the locking member to be switched between the locked state and the unlocked state.

7. The adapter according to claim 6, wherein the locking member comprises a rotating portion, a connecting portion and a locking portion;

the rotating portion runs through one side of the socket body facing away from the jacks and is rotatable;

a first end of the connecting portion is connected to one end of the rotating portion disposed inside the socket body, and a second end of the connecting portion is connected to the unlocking member; and the locking portion is connected to one end of the rotating portion disposed outside the socket body and is extended and stored relative to the guiding body by means of rotation, in a case that the locking portion is extended relative to the guiding body, the locking member is in the locked state; and in a case that the locking portion is stored relative to the guiding body, the locking member is in the unlocked state.

8. The adapter according to claim 7, wherein the locking portion comprises a locking portion body and two locking blocks;

the locking portion body is connected to the rotating portion; and the two locking blocks are connected to opposite sidewalls of the locking portion body and stopped by inner surfaces of top walls, which are located on both sides of an opening, of the rail in the locked state.

9. The adapter according to claim 8, wherein an end of one of the two locking blocks away from the socket body has a guiding surface; and the guiding surface is configured to contact an inner wall of the opening when the locking portion enters the opening of the rail, such that the locking member rotates from the locked state to the unlocked state.

10. The adapter according to claim 9, wherein the unlocking member comprises an operating portion and a transmission portion;

the operating portion is movably connected with a sidewall of the socket body; and a first end of the transmission portion is connected to the operating portion, and a second end of the transmission portion is connected to the connecting portion.

11. The adapter according to claim 7, wherein the unlocking member further comprises a torsion spring, wherein the torsion spring is disposed inside the socket body and sleeves the rotating portion;

two ends of the torsion spring abut against an inner wall of the socket body and the connecting portion respectively; and the torsion spring is configured to maintain the locking member in the locked state.

12. The adapter according to claim 1, wherein the guiding body is rotatably connected to the socket body and is connected to the control member in a transmission fashion; and the movable conducting strip is fixedly connected to the guiding body, and the control member drives the movable conducting strip to rotate by driving the guiding body.

13. The adapter according to claim 12, wherein the control member comprises a second rotating ring and a second transmission assembly;

the second rotating ring is rotatably connected to the socket body; and one end of the second transmission assembly is connected to an inner wall of the second rotating ring in a transmission fashion, and an other end of the second transmission assembly is connected to the guiding body in a transmission fashion.

14. The adapter according to claim 13, wherein the second transmission assembly comprises a transmission shaft, a driving gear, a driven gear and a sun gear;

the driving gear and the driven gear are fixedly connected to two ends of the transmission shaft, respectively;

the driving gear is engaged with the inner wall of the second rotating ring, and the driven gear is engaged with the sun gear; and the sun gear is fixedly connected to the guiding body and is coaxial with the guiding body.

15. The adapter according to claim 14, wherein a second limiting groove is formed inside the socket body; and in a case that the movable conducting strip rotates to a power-taking position, the sun gear is limited to one groove wall of the second limiting groove; and in a case that the movable conducting strip rotates to a power-off position, the sun gear is limited to an other groove wall of the second limiting groove.

16. The adapter according to claim 15, wherein the second transmission assembly further comprises a second swing spring, which is perpendicular to a rotation axis of the guiding body;

a fixed end of the second swing spring is connected to a bottom of the second limiting groove, a movable end of the second swing spring is connected to the sun gear, and the second swing spring is in a compressed state; and the second limiting groove has a flared opening, the second swing spring is configured to swing in a space defined by the second limiting groove, and drive the sun gear to rotate toward the groove wall of the second limiting groove.

17. The adapter according to claim 12, wherein the adapter further comprises an internal conducting strip, which is disposed inside the socket body;

the internal conducting strip is fixedly connected to the guiding body and electrically connected to the movable conducting strip; and an internal plug bush is disposed at an internal end of a second plug bush of the socket body such that a position and shape of the internal plug bush is matched with those of the internal conducting strip, such that the internal conducting strip is plugged into and pulled out from the internal plug bush during a rotation of the guiding body.

* * * * *